US011555456B2

(12) United States Patent
Morenko et al.

(10) Patent No.: US 11,555,456 B2
(45) Date of Patent: Jan. 17, 2023

(54) FUEL DELIVERY SYSTEM AND METHOD

(71) Applicant: PRATT & WHITNEY CANADA CORP., Longueuil (CA)

(72) Inventors: Oleg Morenko, Oakville (CA); Aleksandar Kojovic, Oakville (CA); Jeffrey Richard Verhiel, Mono (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/671,476

(22) Filed: Nov. 1, 2019

(65) Prior Publication Data
US 2021/0025337 A1 Jan. 28, 2021

Related U.S. Application Data

(60) Provisional application No. 62/877,998, filed on Jul. 24, 2019.

(51) Int. Cl.
F02C 9/00 (2006.01)
F02C 9/26 (2006.01)
F02C 7/22 (2006.01)
F02C 7/232 (2006.01)

(52) U.S. Cl.
CPC .............. F02C 9/263 (2013.01); F02C 7/222 (2013.01); F02C 7/232 (2013.01)

(58) Field of Classification Search
CPC .......... F02C 9/263; F02C 7/222; F02C 7/232; F23R 3/343
See application file for complete search history.

(56) References Cited

U.S. PATENT DOCUMENTS 3,869,862 A    3/1975   Dickey
4,083,181 A    4/1978   Adamson
4,251,985 A    2/1981   Sullivan
5,211,005 A *  5/1993   Hovnanian ............. F02C 7/222
                                                          60/800

(Continued)

FOREIGN PATENT DOCUMENTS

EP         0522832 A1 *  1/1993   ............. F02C 7/228
EP         1278014       1/2003
WO    WO-2015145043 A1 * 10/2015   ............. F02C 3/113

OTHER PUBLICATIONS

European Search Report dated Dec. 1, 2020 for Application No. 20187528.3.

(Continued)

Primary Examiner — Katheryn A Malatek
(74) Attorney, Agent, or Firm — Norton Rose Fulbright Canada LLP

(57) ABSTRACT

A method of operating a fuel delivery system of an aircraft engine of an aircraft includes operating the aircraft engine in a standby mode by maintaining combustion in a combustor of the aircraft engine by supplying fuel to the combustor via a first set of fuel nozzles of a first fuel manifold while providing a trickle flow of fuel via a second set of fuel nozzles of a second fuel manifold into the combustor during engine operation, the trickle flow being defined as a fuel flow rate selected to prevent flame-out of the combustion while providing one of: substantially no motive power to the aircraft, and no motive power to the aircraft, via the combustion of the trickle flow of fuel. An aircraft gas turbine engine is also described.

12 Claims, 16 Drawing Sheets

(56) References Cited

U.S. PATENT DOCUMENTS

| | | | |
|---|---|---|---|
| 5,429,208 | A | 7/1995 | Largillier et al. |
| 5,711,145 | A | 1/1998 | Perkey |
| 5,732,730 | A | 3/1998 | Shoemaker et al. |
| 5,735,117 | A | 4/1998 | Toelle |
| 6,915,640 | B2 | 7/2005 | Jonsson |
| 6,921,244 | B2 | 7/2005 | Johnson |
| 7,104,282 | B2 | 9/2006 | Hooker et al. |
| 7,328,098 | B1 | 2/2008 | VanderLeest et al. |
| 7,843,354 | B2 | 11/2010 | Holt et al. |
| 8,166,762 | B2* | 5/2012 | Scully ................ F02C 7/232 60/734 |
| 9,068,463 | B2 | 6/2015 | Pandey et al. |
| 9,222,578 | B2 | 12/2015 | Long |
| 9,303,562 | B2 | 4/2016 | Codron et al. |
| 9,902,500 | B2 | 2/2018 | Stadler et al. |
| 9,903,221 | B2 | 2/2018 | Jacobs et al. |
| 10,012,387 | B2 | 7/2018 | Patel et al. |
| 10,054,051 | B2 | 8/2018 | Foutch et al. |
| 10,060,358 | B2 | 8/2018 | Tiwari et al. |
| 10,247,110 | B2 | 4/2019 | Scipio et al. |
| 10,371,062 | B2* | 8/2019 | Marconi .............. F02C 3/04 |
| 2007/0199301 | A1* | 8/2007 | Shelby ............... F02C 7/232 60/39.281 |
| 2010/0005776 | A1* | 1/2010 | Lueck ................ F02C 9/263 60/39.281 |
| 2012/0073301 | A1 | 3/2012 | Paradise |
| 2014/0196466 | A1 | 7/2014 | Codron et al. |
| 2016/0161123 | A1 | 6/2016 | Patel et al. |
| 2017/0009996 | A1* | 1/2017 | Kim .................... F23R 3/34 |
| 2017/0096946 | A1 | 4/2017 | Rizzo et al. |
| 2017/0210478 | A1 | 7/2017 | Mackin |
| 2017/0241346 | A1 | 8/2017 | Thompson et al. |
| 2018/0080380 | A1 | 3/2018 | Simonetti |
| 2019/0017707 | A1 | 1/2019 | Kim et al. |

OTHER PUBLICATIONS

European Search Report dated Dec. 1, 2020 for Application No. 20187532.5.

European Search Report dated Dec. 1, 2020 for Application No. 20187526.7.

The PW100 Engine: 20 Years of Gas Turbine Technology Evolution, E. Hosking, D. P. Kenny, R. I. McCormick S. H. Moustapha, P. Sampath, A. A. Smailys, presented at the RTO A VT Symposium on "Design Principles and Methods for Aircraft Gas Turbine Engines", held in Toulouse, France, May 11-15, 1998, and published in RTO MP-8-relevant section : p. 4-7, col. 2, lines 5-12.

\* cited by examiner

FUEL DELIVERY SYSTEM AND METHOD

CROSS-REFERENCE

The present application claims the benefit of priority to U.S. Patent Application No. 62/877,998, filed on Jul. 24, 2019, entitled "FUEL DELIVERY SYSTEM AND METHOD", the entire content of which is incorporated herein by reference.

TECHNICAL FIELD

The application relates generally to fuel delivery systems of aircraft.

BACKGROUND

Prior art fuel delivery systems for aircraft may be suitable for their intended purposes. However, improvements in aviation are always desirable.

SUMMARY

In one aspect, there is provided a method of operating a fuel delivery system of an aircraft engine of an aircraft, comprising operating the aircraft engine in a standby mode by maintaining combustion in a combustor of the aircraft engine by supplying fuel to the combustor via a first set of fuel nozzles of a first fuel manifold while providing a trickle flow of fuel via a second set of fuel nozzles of a second fuel manifold into the combustor during engine operation, the trickle flow being defined as a fuel flow rate selected to prevent flame-out of the combustion while providing one of: substantially no motive power to the aircraft, and no motive power to the aircraft, via the combustion of the trickle flow of fuel.

In some embodiments, the providing the trickle flow includes providing a trickle flow of fuel out of the second fuel manifold via a by-pass across a valve in the second fuel manifold.

In some embodiments, the providing the trickle flow includes providing a trickle flow of fuel out of the second fuel manifold via a by-pass across a valve in each of a plurality of fuel nozzles of the second fuel manifold.

In some embodiments, the providing the trickle flow includes providing a trickle flow of fuel to a location downstream of a valve in each fuel nozzle of the second fuel manifold from at least one fuel nozzle of the first fuel manifold.

In some embodiments, the providing the trickle flow includes incompletely closing a valve in each fuel nozzle of the second fuel manifold.

In some embodiments, the method further comprises providing a trickle flow of fuel from a fuel conduit upstream of the first fuel manifold to a fuel conduit upstream of the second fuel manifold while providing the trickle flow of fuel out of the second fuel manifold.

In some embodiments, the method further comprises modulating at least one of the trickle flow out of the second fuel manifold and the trickle flow provided into the fuel conduit upstream of the second fuel manifold.

In some embodiments, the providing the trickle flow of fuel out of the second fuel manifold includes positioning a valve in each fuel nozzle in the second fuel manifold to a substantially closed position.

In some embodiments, the maintaining combustion is part of operating the aircraft engine in a standby mode, and the method further includes switching the aircraft engine from the standby mode to an active mode, the switching including unblocking fuel flow out of the second fuel manifold.

In some embodiments, the unblocking fuel flow includes opening a valve in each fuel nozzle in the second fuel manifold.

In another aspect, there is provided a fuel delivery system for an aircraft engine of an aircraft, comprising: a first fuel manifold operable to deliver fuel to a combustor of the aircraft engine via a first set of fuel nozzles, and a second fuel manifold operable to deliver fuel to the combustor of the aircraft engine via a second set of fuel nozzles; and a controller configured in a standby mode to deliver a trickle flow of fuel to the second set of fuel nozzles while delivering a different flow rate of fuel to the first set of fuel nozzles, the trickle flow being defined as a fuel flow rate selected to prevent flame-out of the combustion while providing one of: substantially no motive power to the aircraft, and no motive power to the aircraft, via the combustion of the trickle flow of fuel.

In some embodiments, the cross-flow fuel conduit is configured to deliver trickle flow of fuel via a by-pass across a valve in the second fuel manifold.

In some embodiments, the second fuel manifold includes a fuel nozzle comprising a valve operable to block fuel flow from the second fuel manifold to the combustor, and a cross-flow fuel conduit fluidly connects to the fuel nozzle at a location that is fluidly downstream of the valve.

In some embodiments, the cross-flow fuel conduit fluidly connects to the first fuel manifold at a location in a fuel nozzle of the first fuel manifold.

In some embodiments, the cross-flow fuel conduit is defined in part by a flow modulating device operable to modulate flow through the cross-flow fuel conduit.

In some embodiments, the fuel delivery system further comprises a fuel control valve upstream of the first and second fuel manifolds, the fuel control valve being operable to supply fuel to: i) both the first and second fuel manifolds, ii) the first fuel manifold while blocking fuel supply to the second fuel manifold, and iii) the second fuel manifold while blocking fuel supply to the first fuel manifold.

In some such embodiments, the valve in the second fuel manifold is a check valve oriented to allow fuel flow into the combustor out of the fuel nozzle of the second fuel manifold.

In another aspect, there is provided an aircraft gas turbine engine, comprising: a combustor; a first fuel manifold comprising a first plurality of fuel nozzles positioned to supply fuel to the combustor; and a second fuel manifold comprising a second plurality of fuel nozzles positioned to supply fuel to the combustor, the second plurality of fuel nozzles being configured to provide a trickle flow of fuel out of a second fuel manifold into the combustor while the aircraft gas turbine engine is operated in a standby mode in which the first plurality of fuel nozzles supply fuel to the combustor.

In some such embodiments, the aircraft gas turbine engine further comprises at least one cross-flow fuel conduit fluidly connecting at least one of the first plurality of fuel nozzles to at least one of the second plurality of fuel nozzles while the aircraft gas turbine engine is operated in the standby mode.

In some such embodiments, the at least one cross-flow fuel conduit is a plurality of cross-flow fuel conduits, the plurality of cross-flow fuel conduits including a cross-flow fuel conduit fluidly connecting to each given fuel nozzle of the second plurality of fuel nozzles at a location downstream of a valve of the given fuel nozzle.

BRIEF DESCRIPTION OF THE DRAWINGS

Reference is now made to the accompanying figures in which.

DETAILED DESCRIPTION

For the purposes of the present description, the term "conduit" with respect to a fluid is used to describe an arrangement of one or more elements, such as one or more conventional hoses, connectors, filters, pumps and the like, as may be suitable for the described functionality of the conduit, and which together form the flow path(s) to provide the functionality described with respect to the conduit. For example, a given air conduit may be defined by any number and combination of air lines, filters, control actuators, and the like, selected to provide the particular functionality described with respect to the given air conduit. As another example, a given fuel conduit may be defined by any number and combination of hoses hydraulically interconnected in parallel and/or series, by or with one or more fuel filters, switches, pumps, and the like, selected to provide the particular functionality described with respect to the given fuel conduit.

Figure 1:
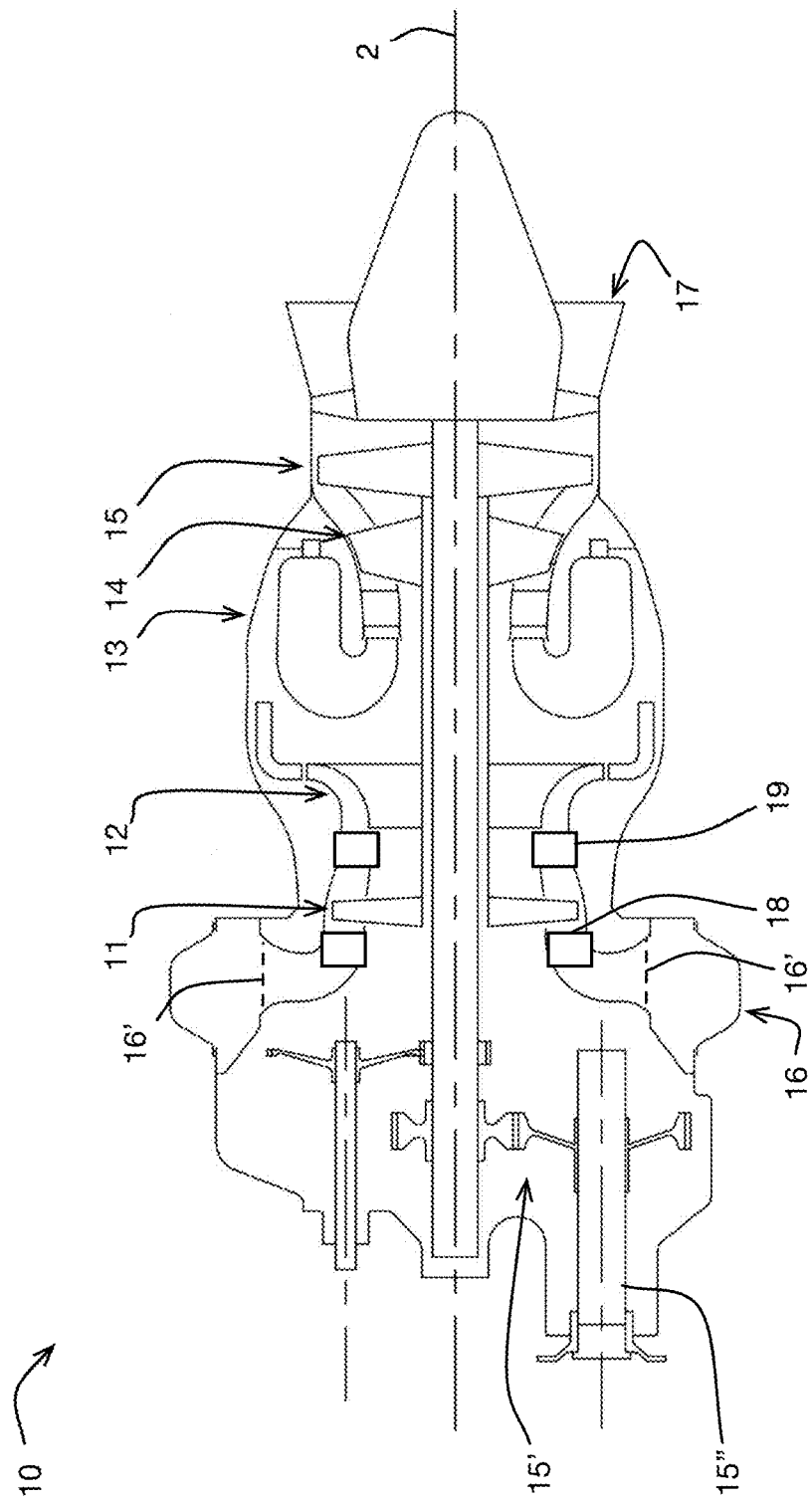
FIG. 1 is a schematic cross sectional view of a gas turbine engine.

FIG. 1 illustrates an example of a gas turbine engine 10. In this example, the gas turbine 10 is a turboshaft engine 10 comprising in serial flow communication a low pressure (LP) compressor section 11 and a high pressure (HP) compressor section 12 for pressurizing air, a combustor 13 in which the compressed air is mixed with fuel and ignited for generating an annular stream of hot combustion gases, a high pressure (HP) turbine section 14, and a lower pressure (LP) turbine section 15. The respective pairs of the compressor and turbine sections 11, 12, 14, 15 are interconnected via respective independently rotatable low pressure (LP) and high pressure (HP) spools, or shafts. This arrangement enables, inter alia, the core flow and processing of air through the engine 10, which is received through an air inlet 16 and exhausted via an exhaust outlet 17 of the turboshaft engine 10.

In the present embodiment, the turboshaft engine 10 further includes a set of variable guide vanes 18, 19 at an inlet of one or both of the compressor sections 11, 14. In other words, relative to a direction of airflow through the core of the turboshaft engine 10, a set of variable guide vanes 18 may be provided upstream of the LP compressor section 11 to modulate airflow into the LP compressor section 11. A set of variable guide vanes 19 may be provided upstream of the HP compressor section 12 to modulate airflow into the HP compressor section 12 and to modulate a power output of the turboshaft engine 10.

The turboshaft engine 10 may include a transmission 15' driven by the LP turbine section 15 via the low pressure shaft and driving a rotatable output shaft 15". In some embodiments, the transmission 15' may vary a ratio between rotational speeds of the low pressure shaft and the output shaft 15".

Figure 2:
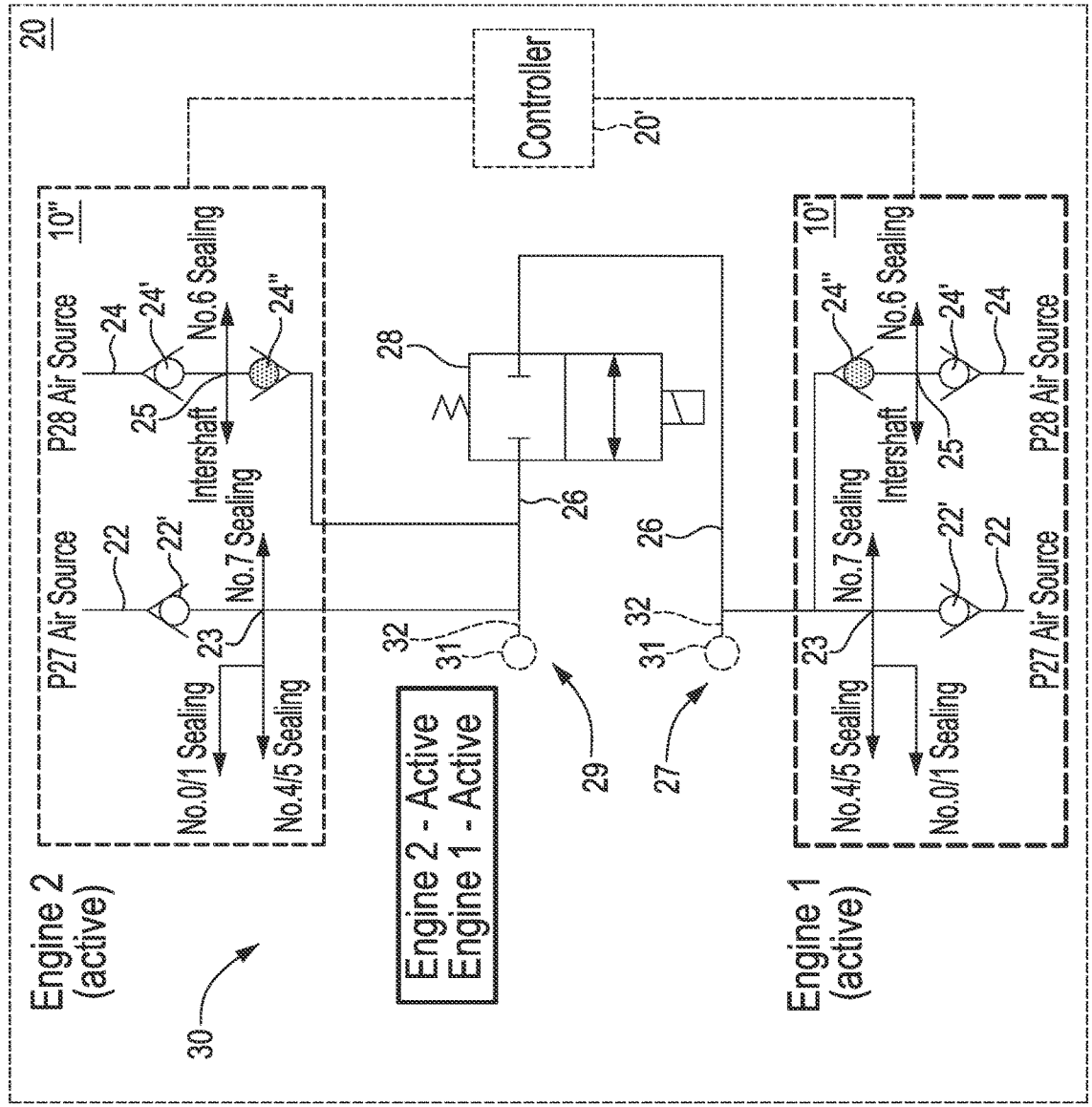
FIG. 2 is a schematic of two gas turbine engines and of an air system of an aircraft, with both of the engines being active.

FIG. 2 schematically illustrates an aircraft 20, in this non-limiting example a helicopter, having a first engine 10', and a second engine 10". The technology as described herein may be implemented with respect to a prior art multi-engine helicopter, and therefore a particular helicopter is not shown or described in detail. For simplicity, only the non-conventional aspects of the present technology are described in detail in this document.

The engines 10', 10" are operable to provide motive power to the aircraft 20 via, for example, one or more conventional transmission systems, which include the transmission 15' shown in FIG. 1, and conventional controls. In this embodiment, each of the engines 10', 10" is substantially the same as engine 10 shown in FIG. 1 and described above. Therefore, only the first engine 10' is described in further detail. Parts of the second engine 10" that correspond to parts of the first engine 10' are labeled with the same numerals.

The illustrated exemplary multi-engine system may be used as a power plant for the aircraft 20, including but not limited to a rotorcraft such as a helicopter. The multi-engine system may include the two or more gas turbine engines 10', 10". In the case of the aircraft 20 being a helicopter, these gas turbine engines 10', 10" will be turboshaft engines. Control of the multi-engine system shown in FIG. 2 is effected by one or more controller(s) 20', which may be FADEC(s), electronic engine controller(s) (EEC(s)), or the like, that are programmed to manage, as described herein below, the operation of the engines 10', 10". In some embodiments and operating conditions, control sequences as described in the present application may reduce an overall fuel burn of the aircraft 20, particularly during sustained cruise operating regimes, wherein the aircraft 20 is operated at a sustained (steady-state) cruising speed and altitude. The cruise operating regime is typically associated with the operation of prior art engines at equivalent part-power, such that each engine contributes approximately equally to the output power of the multi-engine system. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft 20 conditions (cruise speed and altitude) are substantially stable, the engines 10', 10" of the multi-engine system may be operated asymmetrically, with one engine operated in a high-power "active" mode and the other engine operated in a lower-power "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a low-power "standby mode" while the other engine is operated in a high-power "active" mode. In such an asymmetric operation, which may be engaged during a cruise phase of flight (continuous, steady-state flight which is typically at a given commanded constant aircraft cruising speed and altitude). The multi-engine system may be used in an aircraft, such as a helicopter, but also has applications in suitable marine and/or industrial applications or other ground operations.

Referring still to FIG. 2, according to the present description the multi-engine system driving a helicopter 20 may be operated in this asymmetric manner, in which one of the engines 10', 10" may be operated at high power in an active mode and another one of the engines 10', 10" may be operated in a low-power standby mode. In one example, the active engine may be controlled by the controller(s) 20' to run at full (or near-full) power conditions in the active mode, to supply substantially all or all of a required power and/or speed demand of the aircraft 20. The standby engine may be controlled by the controller(s) 20' to operate at low-power or no-output-power conditions to supply substantially none or none of a required power and/or speed demand of the aircraft 20. Optionally, a clutch may be provided to declutch the low-power engine. Controller(s) 20' may control the engine's governing on power according to an appropriate schedule or control regime, for example as described in this document. The controller(s) 20' may be one or multiple suitable controllers, such as for example a first controller for controlling the engine 10' and a second controller for controlling the second engine 10". The first controller and the second controller may be in communication with each other in order to implement the operations described herein. In some embodiments, and a single controller 20' may be used for controlling the first engine 10' and the second engine 10". To this end, the term controller as used herein includes any one of: a single controller controlling the engines 10', 10", and multiple controllers controlling the engines 10', 10".

In another example, an asymmetric operating regime of the engines may be achieved through the one or more controller's differential control of fuel flow to the engines, as described in pending application Ser. No. 16/535,256, the entire contents of which are incorporated herein by reference. Low fuel flow may also include zero fuel flow in some examples and/or times.

Although various differential control between the engines of the multi-engine engine system are possible and some such sequences are described in this document, in one particular embodiment the controller(s) 20' may correspondingly control fuel flow rate to each engine 10', 10" as follows. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric mode, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 20' may operate one engine of the multiengine system in a standby mode at a power substantially lower than a rated cruise power level of the engine, and in some embodiments at zero output power and in other embodiments less than 10% output power relative to a reference power (provided at a reference fuel flow). Alternately still, in some embodiments, the controller(s) 20' may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system of FIG. 2 may be operated in an asymmetric operating regime by control of the relative speed of the engines using controller(s) 20', that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

In use, the one of the engines 10', 10" may operate in the active mode while the other of the engines 10', 10" may operate in the standby mode, as described above. During this asymmetric operation, if the aircraft 20 needs a power increase (expected or otherwise), the active engine(s) may be required to provide more power relative to the low power conditions of the standby mode, and possibly return immediately to a high- or full-power condition. This may occur, for example, in an emergency condition of the multi-engine system powering the helicopter, wherein the "active" engine loses power the power recovery from the lower power to the high power may take some time. Even absent an emergency, it will be desirable to repower the standby engine to exit the asymmetric mode.

As shown schematically in FIG. 2, the first engine 10' includes a first bleed air conduit 22 and a second bleed air conduit 24, both of which bleed compressed air from respective parts of the LP and HP compressor sections 11, 12 of the first engine 10'. In the present embodiment, the first bleed air conduit 22 includes a check valve 24' and branches off into supply bleed air conduits 23 downstream of the check valve. In this embodiment, the second bleed air conduit 24 includes a check valve 24' and a check valve 24". The second bleed air conduit 24 branches off into supply bleed air conduits 25 at one or more locations that are fluidly in between the check valves 24', 24". As shown, the check valves 24', 24" are pointing toward each other, for purposes explained below.

The supply bleed air conduits 23, 25 deliver bleed air to various sealing and lubrication systems of the first engine 10'. The particular number and configuration of the sealing systems may be any suitable number and configuration, and is therefore not described in detail. The supply bleed air conduits 23 and 25 may also provide bleed air for various other functions of the first engine 10' and/or the aircraft. Examples of such functions include, but are not limited to, cooling of turbines, maintenance of cabin pressure, operation of air systems, and pressurizing liquid tanks. Any suitable air piping and controls arrangement may be used to provide for each particular combination of the functions provided for by the bleed air from the first and second bleed air conduits 22, 24.

Still referring to FIG. 2, the first and second bleed air conduits 22, 24 of the first engine 10' fluidly converge/join into a common bleed air conduit 26. The common bleed air conduit 26 fluidly connects to a control valve 28. The control valve 28 may be any suitable one or more control valves so long as it provides for the functionality described in this document. The conduits 22, 23, 24, 25, 26 and valves 22', 24', 24" of the first engine 10' are part of a bleed air system 27 of the first engine 10'.

As noted above, in this embodiment, the bleed air system 27 bleeds compressed air, via conduits 22 and 24, from the LP compressor section 11 and the HP compressor section 12 of the first engine 10', and supplies it to various parts of the first engine 10' including bearing assemblies for sealing and intershaft for lubrication. It is contemplated that the bleed air system 27 may have a different combination of functions and/or other functions. The rest of the bleed air system 27 may be conventional and is therefore not shown or described in detail herein. Details of the bleed air system 27 that are not shown or described herein may be conventional, and are omitted to maintain clarity of this description.

As shown in FIG. 2, in the present embodiment, the bleed air system 29 of the second engine 10" is similar to the bleed air system 27 of the first engine 10', described above. Therefore, to maintain simplicity of this description, the bleed air system 29 of the second engine 10" is not described in detail. Suffice it to say that parts of the bleed air system 29 of the second engine 10" that correspond to parts of the bleed air system 27 of the first engine 10' are labeled with the same numerals. Each of the bleed air systems 27, 29 of the aircraft 20 is sized and designed to provide all of its functions at least when the engine 10', 10" that has the bleed air system 27, 29 is in an "active" mode (i.e. providing motive power to the aircraft 20). However, as described in more detail later in this document, each of the engines 10', 10" in this embodiment is also configured to operate in a "sub-idle" mode while at least another one of the engines 10', 10" is in an active mode.

For the purposes of this document, the term "active" used with respect to a given engine means that the given engine is providing motive power to the aircraft with which it is used. For the purposes of this document, the terms "standby" and "sub-idle" are used with respect to a given engine to mean that the given engine is operating but is providing no motive power, or at least substantially no motive power, to the aircraft with which it is used, with the "sub-idle" operation being a particular type of standby operation according to the present technology as described in this document.

In the "sub-idle" mode, the engine 10', 10" operates at a power level at which the engine 10', 10" provides no motive power, or substantially motive power, to the aircraft 20. In at least some operating conditions, while in the sub-idle mode, and but-for the selective air interconnection between the bleed air systems 27, 29 described below, a given engine 10', 10" may not provide sufficient pressure and/or supply rate of bleed air to its bleed air system 27, 29 in order to enable that bleed air system 27, 29 to provide all of its intended functions.

For the purposes of this document, the term "self-sufficient" used with respect to a given bleed air system of a given engine means that the given bleed air system of the given engine provides all of its intended functions for the duration of the time during which it is called upon to provide the functions. A given bleed air system of a given engine is not "self-sufficient" when one or more of the intended functions of the given bleed air system may be unavailable or unstable due to a lack of bleed air pressure and/or bleed air supply rate provided by the corresponding engine to the given bleed air system. The selective air interconnection between the bleed air systems 27, 29 provides for "self-sufficient" of each of the bleed air systems 27, 29 when the engine 10', 10" having that bleed air system 27, 29 operates in a sub-idle mode. A non-limiting embodiment of the selective air interconnection according to the present technology is described next, in detail.

As shown in FIGS. 1 and 2, the common bleed air conduit 26 of the second engine 10", similar to the common bleed air conduit 26 of the first engine 10', fluidly connects to a control valve 28. The control valve 28 is operable by a controller 20' of the aircraft 20, such as one or more full authority digital controllers (FADEC) (FIG. 1, which may be part of the aircraft 20 and/or the engine(s) 10 for example), to selectively: i) fluidly connect the common bleed air conduit 26 of the first engine 10' to the common bleed air conduit 26 of the second engine 10", and ii) fluidly disconnect the common bleed air conduit 26 of the first engine 10' from the common bleed air conduit 26 of the second engine 10", as illustrated by the internal structure of the control valve 28 schematically shown in FIG. 2. The control valve 28 may be actuated using any suitable actuator of the engines 10', 10" and/or of the aircraft 20.

Figure 3:
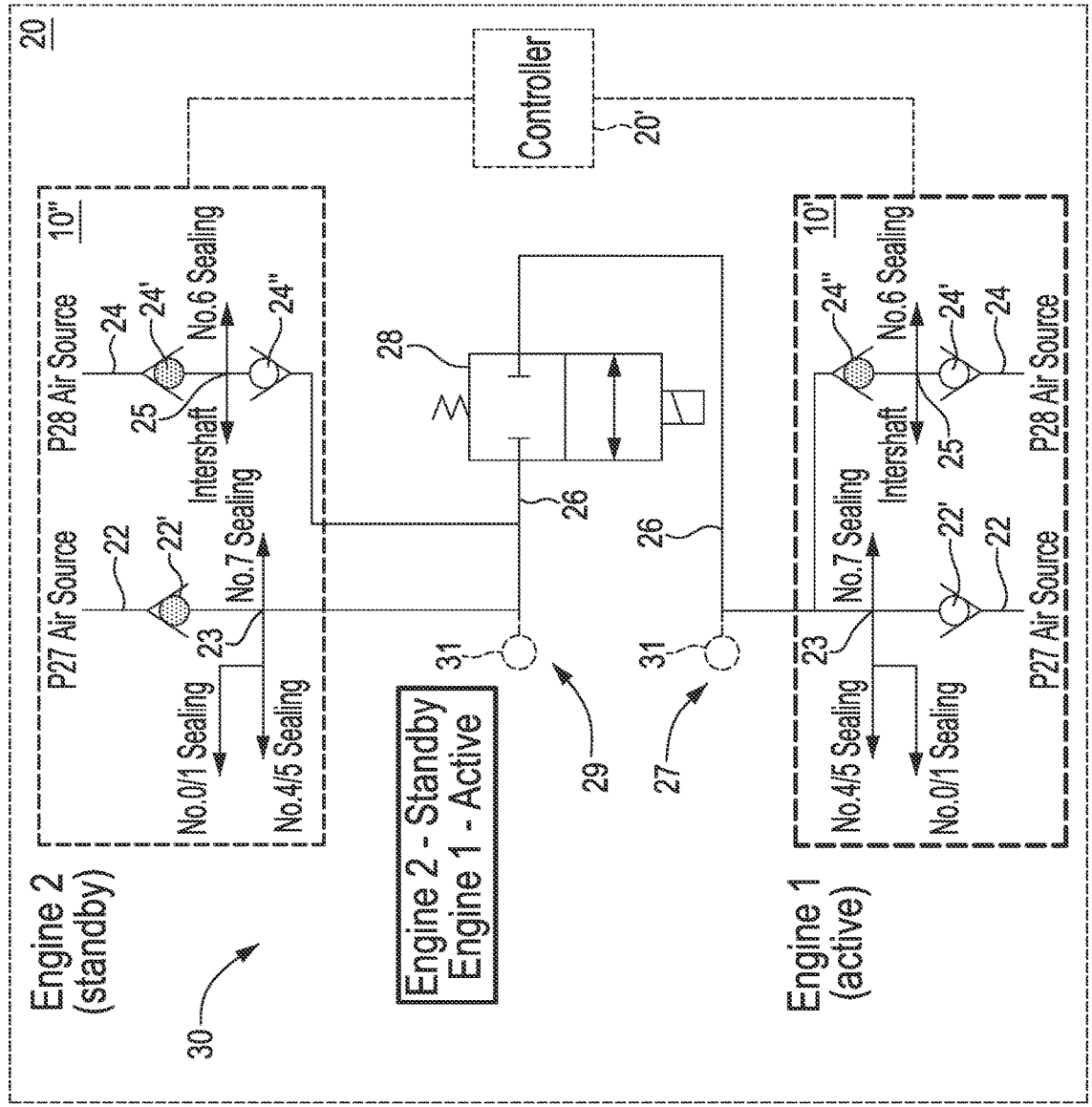
FIG. 3 is a schematic of the two gas turbine engines and of the air system of FIG. 2, with one of the engines being active and another one of the engines being on standby.

FIG. 2 shows a first in-flight, cruise, mode of operation of the aircraft 20 during which both engines 10', 10" are operating in an active mode, and are therefore both providing motive power to the aircraft 20. In this operating condition, the bleed air system 27 of the first engine 10' and the bleed air system 29 of the second engine 10" are both self-sufficient without a need to use the control valve 28. Reference is now made to FIG. 3, which shows a second in-flight, cruise, mode of operation of the aircraft 20 during which: i) the first engine 10' is "active" and is therefore providing motive power to the aircraft 20, and ii) the second engine 10" is operating in a sub-idle mode and is therefore not providing any material amount of motive power to the aircraft 20. In this operating condition (i.e. in the second in-flight mode of operation), the bleed air system 27 of the first engine 10' is self-sufficient. On the other hand, depending on each particular embodiment of the engines 10', 10" and/or the aircraft 20 and/or on the characteristics of the particular sub-idle operation of the second engine 10", the bleed air system 29 of the second engine 10" may or may not be self-sufficient in the sub-idle mode.

For this reason, during the second in-flight mode of operation of the aircraft 20, the control valve 28 may be actuated by a suitable controller of the aircraft 20 to fluidly connect the common bleed air conduit 26 of the first engine 10' to the common bleed air conduit 26 of the second engine 10", to provide for an additional supply of bleed air from the bleed air system 27 of the first engine 10' to the bleed air system 29 of the second engine 10". The common bleed air conduit 26, the throughput of the control valve 28, and the size of the bleed air system 27 may be selected so as to provide enough of a flow and pressure of the additional supply of bleed air to the bleed air system 29 so as to enable self-sufficient operation of the bleed air system 29 simultaneously with self-sufficient operation of the bleed air system 27, with the second engine 10" being in sub-idle mode. Conventional engineering principles may be used to provide for such sizing, to suit each particular embodiment and/or application of the aircraft 20.

After the second engine 10" is brought into an "active" state while the first engine 10' is in an "active" state, the control valve 28 may be actuated by a suitable controller of the aircraft 20 to fluidly disconnect the common bleed air conduit 26 of the first engine 10' from the common bleed air conduit 26 of the second engine 10", as shown in FIG. 2. After the first engine 10' is put into a standby mode or a sub-idle mode while the second engine 10" is in an "active" mode, the control valve 28 may be actuated by a suitable controller of the aircraft 20 to fluidly connect the common bleed air conduit 26 of the first engine 10' to the common bleed air conduit 26 of the second engine 10".

The bleed air system 29 of the second engine 10" may thereby provide compressed air to the bleed air system 27 of the first engine 10'. Similarly, the common bleed air conduit 26, the throughput of the control valve 28, and the size of the bleed air system 29 may be selected so as to provide enough of a flow and pressure of the additional supply of bleed air to the bleed air system 27 so as to enable self-sufficient operation of the bleed air system 27 simultaneously with self-sufficient operation of the bleed air system 29, with the first engine 10' being in sub-idle mode. Self-sufficiency of both of the bleed air systems 27, 29 of the aircraft 20 during all modes of operation of the engines 10', 10" may thereby be provided.

Further, the sub-idle mode of operation as described herein has been developed as a way to improve upon prior art methods of idle operation of one or more aircraft engines, and is therefore not part of the prior art as of the time of writing this description. However, the selective air interconnection of two or more engines of an aircraft as described herein may be implemented in multi-engine aircraft, such as at least some helicopters, in which one or more of the engines are operable in a prior art idle mode. The bleed air systems 27, 29 of the engines 10', 10" and the control valve 28 are part of an air system 30 of the aircraft 20. As described above, the air system 30 of the aircraft 20 implemented according to the present technology may therefore provide for self-sufficient operation of at least one of the engines 10', 10" and/or the engines' 10', 10" bleed air system(s) 27, 29 in at least some operating conditions of the aircraft 20 in which at least some prior art engines and/or engine bleed air systems may not be self-sufficient.

Further according to the present technology, as shown in FIGS. 2 and 3 for example, in the present embodiment, the check valves 24' and 24" are provided in the bleed air conduits 24, downstream of the branching-out bleed air conduits 25. In this embodiment, this the branching-out bleed air conduits 25 may supply compressed air to at least some subsystems of the respective engines 10', 10". Each of the check valves 24' and 24" ensures that when the engine 10', 10" having that check valve 24', 24" is providing compressed air from its bleed air system 27, 29 to the bleed air system 27, 29 of the other engine 10', 10", the compressed air is provided from the air source corresponding to the bleed air conduit 22 of that engine 10', 10". The check valves 24' and 24" therefore help ensure uncompromised self-sufficient operation of the subsystems of the one of the engines 10', 10" that may at a given time be providing compressed air to the other one of the engines 10', 10". In some embodiments, the check valve 24' and/or the check valve 24" may be omitted.

The rest of the air system 30 that is not shown in the figures of the present application may be conventional and is therefore not described in detail herein. Any suitable controls and any suitable control logic may be used to provide for the functionality of the air system 30, and/or for various timings of actuation of the control valve 28 to suit the various different operations of the aircraft 20.

Figure 4:
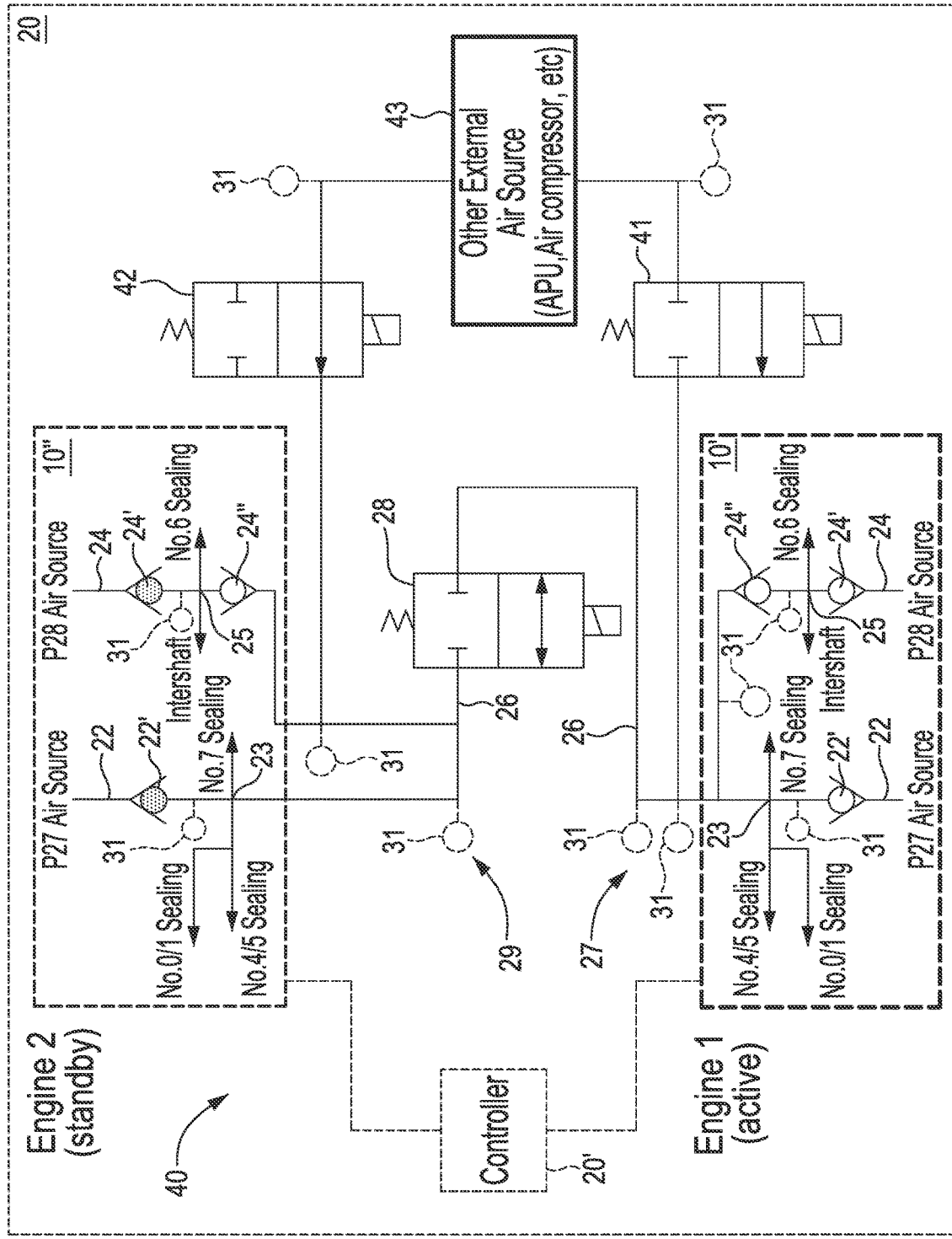
FIG. 4 is a schematic of two gas turbine engines and of the air system of the aircraft of FIG. 2, the air system being implemented according to an embodiment.

Referring now to FIG. 4, an air system 40 of the aircraft 20, which is an alternative embodiment of the air system 30 is shown. The air system 40 is similar to the air system 30, and therefore similar reference numerals have been used for the air system 40. A difference of the air system 40 from the air system 30, is that air system 40 includes a control valve 41, a control valve 42, and an external compressed air source 43 such as an auxiliary power unit (APU) and/or an air compressor for example. The external compressed air source 43 may be any conventional external compressed air source suitable for each particular embodiment of the engines 10', 10" and the aircraft 20.

The control valve 41 selectively fluidly connects the external compressed air source 43 to the common bleed air conduit 26 of the first engine 10', via any suitable corresponding air conduits. More particularly, when the first engine 10' is "active", the control valve 41 may be actuated by a suitable controller of the aircraft 20 to fluidly disconnect the external compressed air source 43 from the common bleed air conduit 26 of the first engine 10', and may thereby allow the bleed air system 27 of the first engine 10' to run self-sufficiently.

When the first engine 10' is in a sub-idle mode according to the present technology (further, simply "in a sub-idle mode"), or on "standby" according to prior art methods, the control valve 41 may be actuated by a suitable controller of the aircraft 20 to fluidly connect the external compressed air source 43 to the common bleed air conduit 26 of the first engine 10'. The control valve 41 may thereby provide that additional/"supplemental" compressed air to the bleed air system 27 of the first engine 10' at a supply rate and pressure sufficient to allow the bleed air system 27 of the first engine 10' to provide for all of its intended functions during sub-idle or standby operation of the first engine 10'. The control valve 41, via corresponding air conduit(s), may selectively fluidly connect the external compressed air source 43 to a different part of the bleed air system 27 of the first engine 10', so long as the functionality described above is provided.

The control valve 42 similarly fluidly connects the external compressed air source 43 to the common bleed air conduit 26 of the second engine 10", and is actuated according to a similar control logic to allow the bleed air system 29 of the second engine 10" to provide for all of its intended functions during sub-idle or standby operation of the second engine 10". As shown, the control valve 28 that fluidly connects the bleed air system 27 of the first engine 10' to the bleed air system 29 of the second engine 10" may be in a position in which it fluidly disconnects the first engine 10' from the second engine 10", to allow for the supplemental compressed air to be provided to either one, or to both, of the engines 10', 10" by the external compressed air source 43. In some embodiments, the control valves 28, 41, 42 may be actuated correspondingly to switch between the various possible supply modes of air described above. For example, in some operating conditions, the bleed air system 27, 29 of one of the engines 10', 10" may receive "supplemental" compressed air from one or both of: i) the bleed air system 27, 29 of another one of the engines 10', 10", and ii) the external compressed air source 43.

Figure 5:
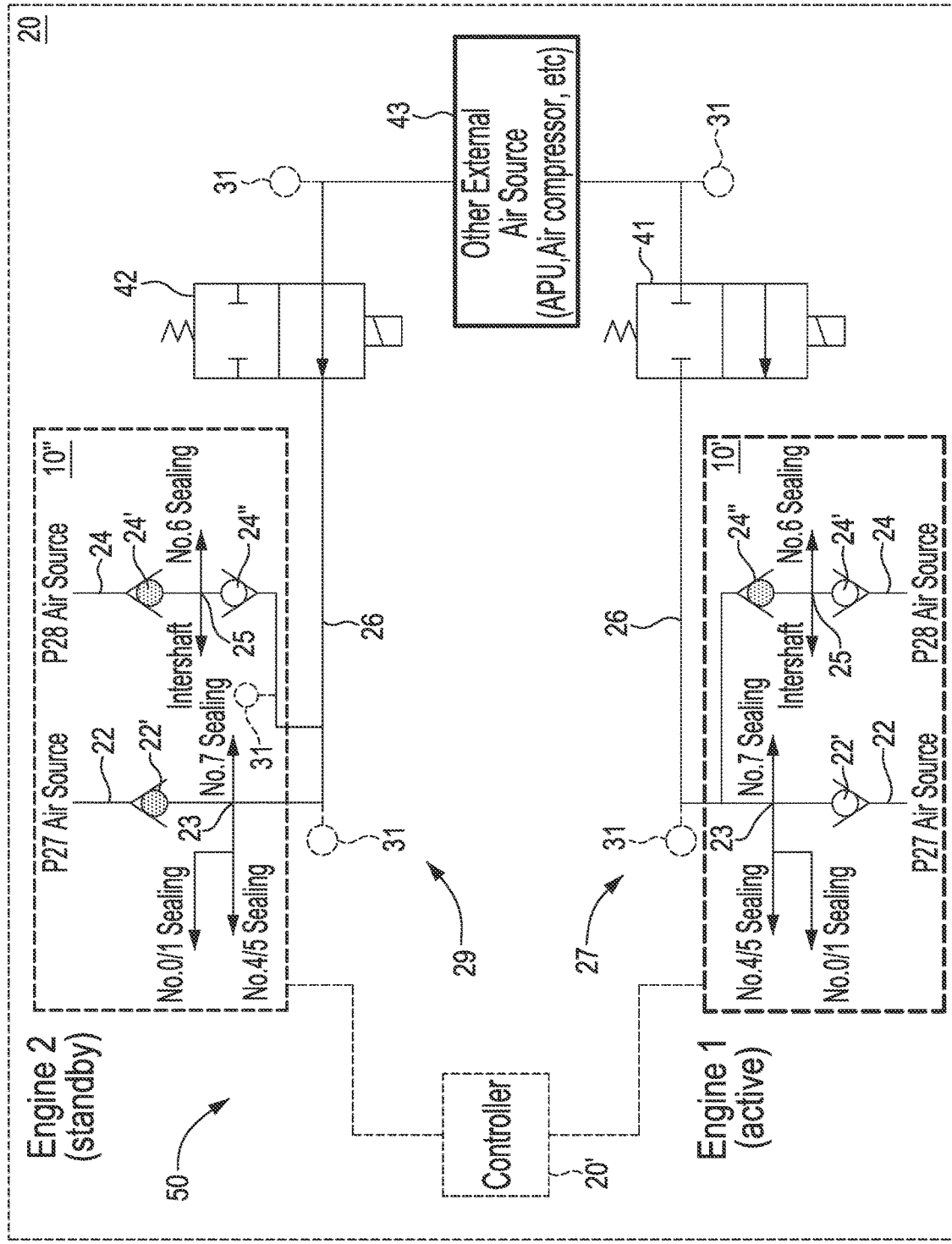
FIG. 5 is a schematic of two gas turbine engines and of the air system of the aircraft of FIG. 2, the air system being implement according to another embodiment.
Figure 6:
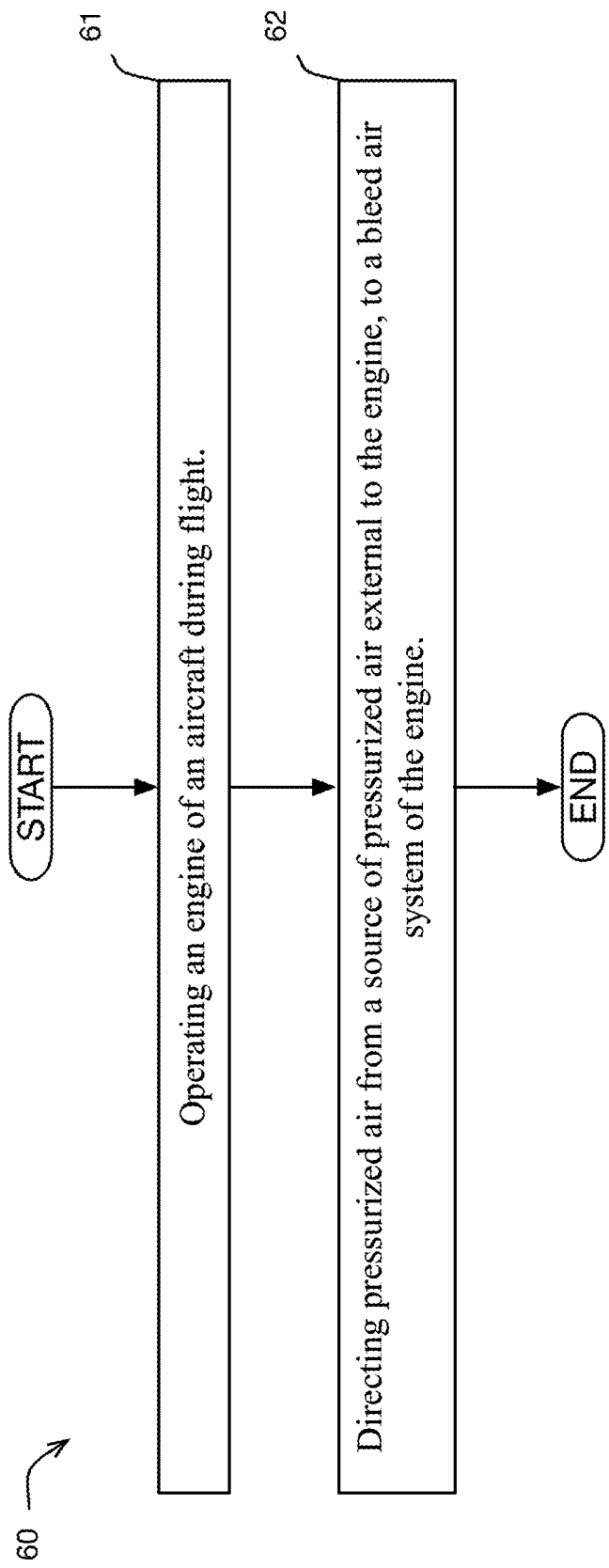
FIG. 6 is a schematic logic diagram showing a method implemented according to an embodiment of the present technology.
Figure 7:
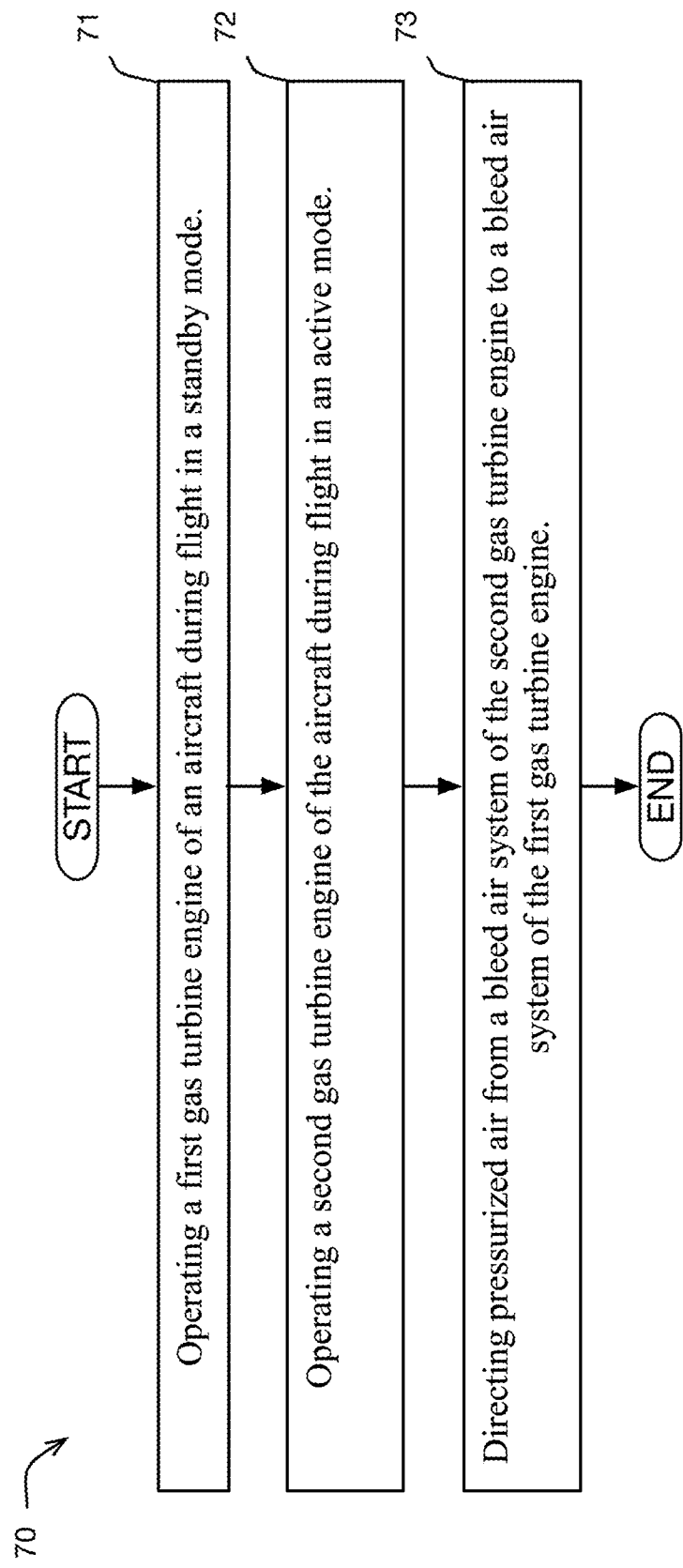
FIG. 7 is a schematic logic diagram showing a method implemented according to another embodiment of the present technology.

Referring now to FIG. 5, an air system 50 of the aircraft 20, which is yet another alternative embodiment of the air system 30 is shown. The air system 50 is similar to the air system 40, and therefore similar reference numerals have been used for the air system 50. A of the air system 50 difference from the air system 40, is that air system 50 does not have a control valve 28 for fluidly connecting the bleed air system 27 of the first engine 10' to the bleed air system 29 of the second engine 10". Operation of the air system 50 is similar to operation of the air system 40 with respect to the external compressed air source 43.

In at least some embodiments and applications, the air systems 30, 40, 50 may allow to provide "supplemental" compressed air to the bleed air system 27, 29 of one of the engines 10', 10" in at least some cases where that bleed air system 27, 29 is malfunctioning and/or leaking air for example. A person skilled in the art will appreciate that while a particular air conduit arrangement is shown in FIGS. 1 to 5, other air conduit arrangements may be used while providing for at least some of the functionality described in this document. While a single external compressed air source 43 is used in the embodiments of FIGS. 4 and 5, multiple different external compressed air sources may be used. Likewise, while the example aircraft 20 has two engines 10', 10", the present technology may be implemented with respect to more than two engines and/or with respect to other types of engines.

With the above systems in mind, the present technology provides a method 60 of using, in flight, a source of pressurized air external to an engine of an aircraft 20. As seen above, in some embodiments and operating conditions, the source of pressurized air may be one of the engines 10', 10" of the aircraft 20, and in some embodiments, an APU 43 or air compressor 43 of the aircraft 20. In some embodiments, the method 60 includes a step 61 of operating a given engine 10', 10" of the aircraft 20 during flight. In some embodiments, the method 60 also includes a step 62 of directing pressurized air from the source of pressurized air external to the given engine 10', 10", to a bleed air system 27, 29 of the given engine 10', 10".

In some embodiments, the given engine 10', 10" to which pressurized air is directed is a first engine 10' of the aircraft 20, the aircraft 20 includes a second engine 10", and the source of pressurized air external to the first engine 10' is a bleed air system 29 of the second engine 10". As seen above, in some embodiments, the aircraft 20 is a multi-engine helicopter in which the engines 10', 10" are operatively connected to drive at least one main rotor of the helicopter to provide motive power to/propel the helicopter.

As seen above, in some embodiments, the directing pressurized air to the bleed air system 27 of the first engine 10' is executed when the first engine 10' is operating in a sub-idle mode on or standby. In embodiments in which the source of the pressurized air is the bleed air system 29 of the second engine 10", the second engine 10" is active (i.e. providing motive power to the helicopter). Similarly, in some operating conditions during flight, the given engine 10', 10" to which pressurized air is directed is a second engine 10" of the aircraft 20. In some such cases, the source of pressurized air external to the second engine 10" is a bleed air system 27 of the first engine 10'. In some such cases, the second engine 10" is operating in a sub-idle mode or on standby while the first engine 10' providing the compressed air is active (i.e. providing motive power to the helicopter).

As seen above, in some embodiments, the source of pressurized air is a first source of pressurized air (e.g. first engine 10' or second engine 10", depending on which of these engines is active and which is in sub-idle operation or on standby), the aircraft 20 includes a second source of pressurized air (e.g. APU/air compressor 43 of the aircraft 20). In some such embodiments, the second source of pressurized air 43 is external to both the first engine 10' and the second engine 10". In some such embodiments and in some flight conditions, the method 60 comprises directing pressurized air from the second source of pressurized air 43 to the first engine 10'. In some such embodiments and in some flight conditions, the method 60 comprises directing pressurized air from the second source of pressurized air 43 to the second engine 10". Further in some such embodiments and in some flight conditions, the method 60 comprises directing pressurized air from the second source of pressurized air 43 to both the first engine 10' and the second engine 10".

Further with the structure of the aircraft 20 described above, the present technology also provides method 70 of operating a bleed air system 27 of a first gas turbine engine 10' of a multi-engine aircraft 20 during flight. In some embodiments, the method 70 comprises a step 71 of operating the first gas turbine engine 10' of the aircraft 20 during flight in a sub-idle or in a standby mode, such as an idle or a sub-idle mode that provides either no motive power or at least materially no motive power to the aircraft 20. In some embodiments, the method 70 comprises a step 71 of operating a second gas turbine engine 10" of the aircraft 20 during flight in an active mode (i.e. providing non-substantially-zero motive power to the aircraft 20).

In some cases, the steps 71 and 72 are executed simultaneously. In some such cases, the method 70 comprises directing pressurized air from a bleed air system 29 of the second gas turbine engine 10" to a bleed air system 27 of the first gas turbine engine 10'.

In some cases, the method 70 further includes a step 73 of operating a source of pressurized air (E.g. APU/air compressor 43, and the like) of the aircraft 20 external to both the first gas turbine engine 10' and the second gas turbine engine 10", and a step of directing pressurized air from the source of pressurized air 43 to at least one of the first gas turbine engine 10' and the second gas turbine engine 10".

In some cases, the directing pressurized air from one of the bleed air systems 27, 29 to the other one of the bleed air systems 27, 29 (depending on which one of the bleed air systems 27, 29 requires supplemental compressed air) may be executed simultaneously with directing pressurized air from a second source of pressurized air to the one of the bleed air systems 27, 29 that is receiving the supplemental compressed air. In some embodiments, the second source of pressurized air 43 includes, or is, at least one of: an APU 43 of the aircraft 20, and an air compressor 43 of the aircraft 20.

In some such cases, the air pressure in the one of the bleed air systems 27, 29 receiving supplemental compressed air may be lower than the pressure of the supplemental compressed air. It is contemplated that any suitable controls and control arrangements may be used to provide for this pressure differential, where required. While two engines 10', 10" of an aircraft 20 are described, it is contemplated that the present technology could be implemented with regard to a larger number of engines of an aircraft to provide supplemental compressed air from one or more of the engines or other compressed air source(s), to one or more other ones of the engines.

In at least some cases and in at least some embodiments, the technology described above may be implemented with, and may help provide stable sub-idle operation of one or more engines of a multi-engine aircraft. Operating one or more of an aircraft's multiple engines in a sub-idle mode according to the present technology is described in detail next.

Figure 8:
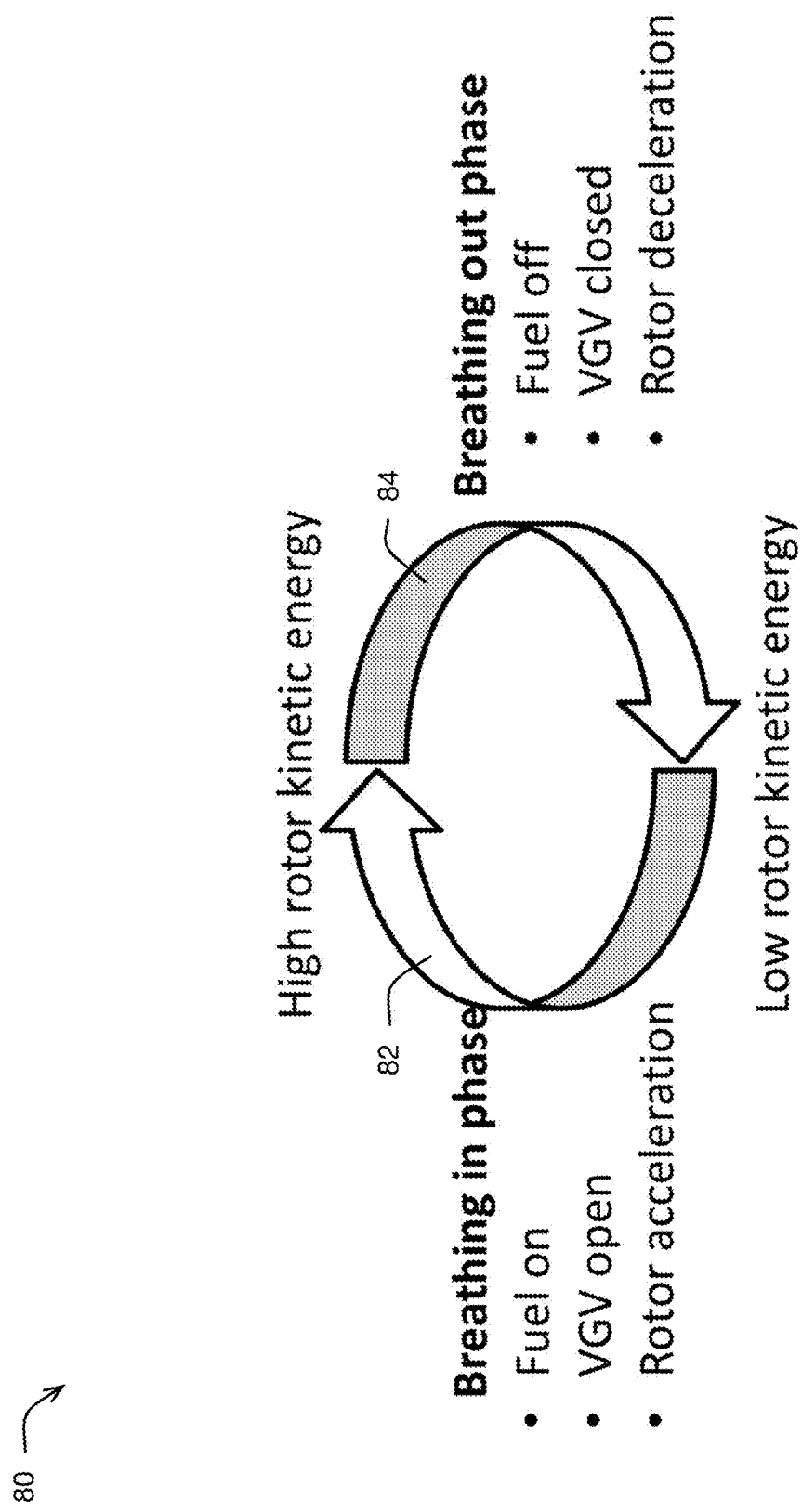
FIG. 8 is a schematic showing a breathing cycle of the present technology, when implemented with respect to the engine of FIG. 1.

Referring to FIG. 8, the present technology provides a sub-idle mode 80 of operation of an aircraft engine 10, 10', 10". The present embodiment of the sub-idle mode 80 is illustrated with respect to the engine 10 of FIG. 1, but may be executed with regard to a different aircraft engine as well, such as one of the engines 10' and 10" of the aircraft 20 described above.

Operating the engine 10 in sub-idle mode 80 according to the present technology uses the rotor(s), such as the shafts/compressors/turbines 11, 12, 14, 15, of the engine 10 as energy accumulators, by running the engine 10 at lower speeds at least during repeating predetermined time intervals, in comparison with speeds at which a similar engine may be operated according to at least some prior art stand-by methods of operation. It has been found by the developers of the present technology that the sub-idle mode 80 provides a lower overall fuel consumption over a given operating time period in comparison with at least some prior art stand-by methods applied to similar sized/powered engines in at least some similar applications and/or operating conditions.

As shown in FIG. 8, in the present embodiment, the sub-idle mode 80 includes a breathing-in phase 82 and a breathing-out phase 84, executed in a repeating sequence. In the present embodiment, the breathing-in phase 82 includes opening, or open, the variable guide vanes 18, 19 at the air inlet 16 of the engine 10, and supplying fuel to the combustor 13 of the engine 10 while combustion is occurring therein or while initiating combustion, until the rotors 11, 12, 14, 15 have reached an upper pre-determined level of kinetic energy. In some embodiments, the upper pre-determined level of kinetic energy corresponds to a speed of the engine 10 at or above an idle speed of the engine 10.

Once the upper pre-determined level of kinetic energy is reached, a breathing-out phase 84 may be executed. As shown, the present embodiment, the breathing-out phase 84 includes closing the variable guide vanes 18, 19 at the air inlet 16 of the engine 10 and reducing fuel flow to the combustor 13 of the engine 10 to at least one level that is below an idle speed of the engine 10. In some embodiments, the fuel flow is terminated during the breathing-out phase 84.

In an aspect, the closing of the variable guide vanes 18, 19 at the air inlet 16 during each breathing-out phase 84 limits entry of air into the engine 10 and thereby reduces drag and other losses at the rotors 11, 12, 14, 15 of the engine 10. This helps conserve, for as long as possible, the kinetic energy stored in the rotors 11, 12, 14, 15 as a result of a sequentially preceding breathing-in phase 82. Rotating the rotors 11, 12, 14, 15 of the engine 10 with the variable guide vanes 18, 19 at the air inlet 16 being closed to restrict airflow through the air inlet 16 is referred to herein as a lower drag mode.

According to the present embodiment, the breathing-out phase 84 is executed until the kinetic energy in the rotors 11, 12, 14, 15 drops to a lower pre-determined level of kinetic energy, at which point a sequentially next breathing-in phase 82 is executed to restore the kinetic energy to the upper pre-determined level for a sequentially next breathing-out phase 84. The breathing-in phases 82 and the breathing-out phases 84 are executed sequentially one after the other to provide for the sub-idle mode 80 of operation of the engine 10. In an aspect, in at least some embodiments and applications of the engine 10, the sub-idle mode 80 allows to reduce fuel consumed by the engine 10 over a given time period, in comparison with prior-art idle operation methods that, for example, may run the engine 10 at a constant idle speed. In another aspect, in at least some embodiments and applications of the engine 10, the sub-idle mode 80 allows the engine 10 to respond quickly to a sudden power demand stemming from the application in which the engine 10 is used.

Figure 9:
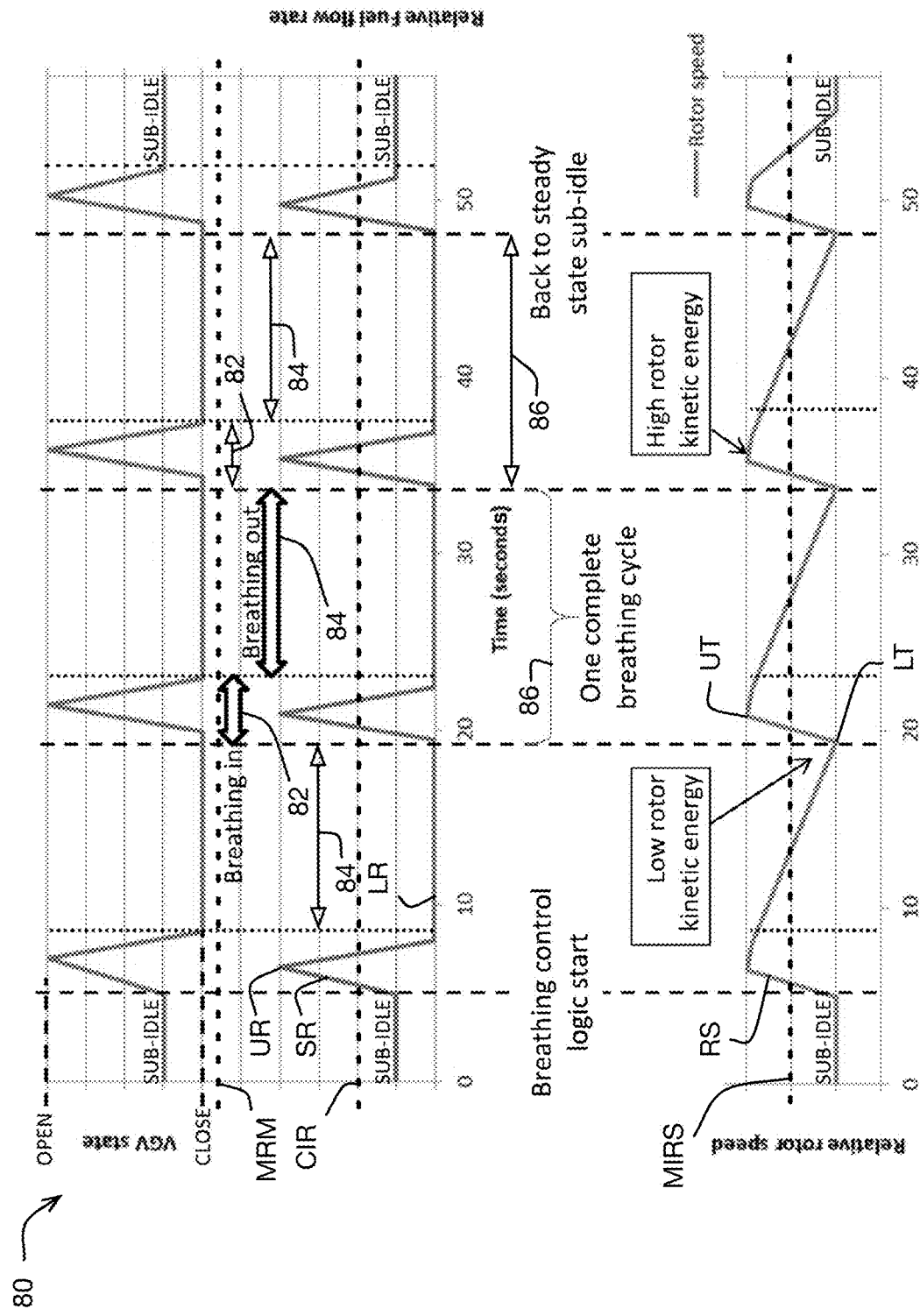
FIG. 9 is a schematic showing the breathing cycle of FIG. 8 in more detail.

Now referring to FIG. 9, the breathing-in phases 82 and the breathing-out phases 84 of the sub-idle mode 80 of the present embodiment are shown and described in more detail. As shown, the breathing-in phases 82 all have one and the same VGV and fuel-flow profile, and the breathing-out phases 84 all have one and the same VGV and fuel-flow profile. However, it is contemplated that in other embodiments the breathing-in phases 82 and/or the breathing-out phases 84 could each include more than one profile. More particularly, the breathing-in phases 82 and the breathing-out phases 84 of the present technology may be executed with respect to an engine 10, 10', 10" in a sequential series of cycles 86, referred to herein as "breathing cycles 86", and may thereby provide for sub-idle operation of the engine 10, 10', 10" which maintains rotation of the engine's rotors 11, 12, 14, 15 and allows the engine 10, 10', 10" to be ready to quickly respond to a sudden demand for motive power from that engine 10, 10', 10".

Figure 10:
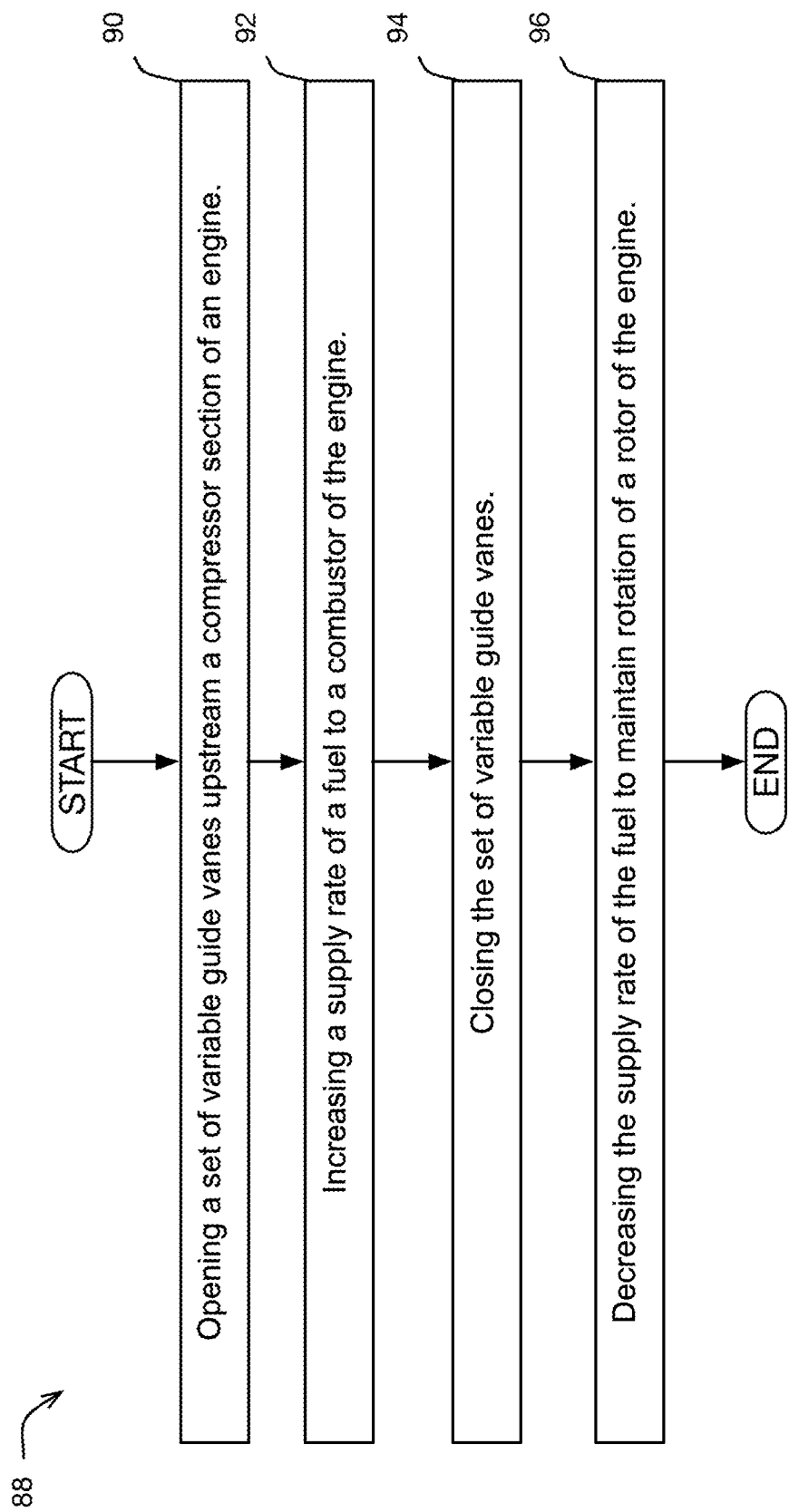
FIG. 10 is a schematic logic diagram showing a method implemented according to an embodiment of the present technology.

More particularly, with the above structure in mind and now also referring to FIG. 10, there is provided a method 88 of operating an engine 10, 10', 10" of a multi-engine aircraft 20. In some embodiments, the method 88 includes operating the engine 10, 10', 10" in a sub-idle mode, such as the sub-idle mode shown in FIG. 9. As shown in FIG. 9, in some embodiments, the sub-idle mode includes executing a step 90 of opening a set of variable guide vanes, such as the set of variable guide vanes 18 and/or 19 shown in FIG. 1, upstream an air compressor section, such as the LP compressor section 11 and/or the HP compressor section 19, of the engine 10, 10', 10".

Also as shown in FIG. 9, in some embodiments, the sub-idle mode includes executing a step 92 of increasing a supply rate (shown as the slope of the fuel flow graph labeled "SR" in FIG. 9) of a fuel to the combustor 13 of the engine 10, 10', 10" to an upper supply rate "UR". As shown, in some such embodiments, the upper supply rate "UR" is lower than a minimum fuel supply rate "MRM" required for the engine 10, 10', 10" to provide a material amount of motive power (or simply, "to provide motive power") to the aircraft 20, and greater than a minimum constant fuel supply rate "CIR" required to maintain rotation of the rotors 11, 12, 14, 15 at a substantially constant minimum idle rotation speed "MIRS" of the engine 10, 10', 10". Each of the minimum fuel supply rate "MRM", the minimum constant fuel supply rate "CIR", and the substantially constant minimum idle rotation speed "MIRS" may be a function of each particular embodiment and type of engine 10, 10', 10" and/or the aircraft 20 and/or the application with which the present technology is used, and may be different and in at least some cases may be specified by the manufacturer(s) for each particular embodiment and type of engine 10, 10', 10"/ aircraft 20/application.

In some embodiments, the sub-idle mode includes executing a step 94 of closing the set(s) of variable guide vanes 18 and/or 19, and a step 96 of decreasing the supply rate "SR" of the fuel to a lower supply rate "LR" that is lower than the upper supply rate "UR", to maintain rotation of the rotors 11, 12, 14, 15 of the engine 10, 10', 10". As shown, in some embodiments, the lower supply rate "LR" is a zero supply rate, meaning that the flow of fuel to the combustor 13 is shut off. However, in other embodiments and depending on the particular embodiment of the engine 10, 10', 10" for example, the lower supply rate "LR" is a non-zero supply rate, but is in at least some cases lower than the minimum constant fuel supply rate "CIR" required to maintain rotation of the rotors 11, 12, 14, 15 at the substantially constant minimum idle rotation speed "MIRS" of the engine 10, 10', 10".

Also as shown in FIG. 9, in each given breathing cycle 86, the step 92 of increasing the supply rate "SR" to the upper supply rate "UR" is followed by the step 96 of decreasing the supply rate "SR" to the lower supply rate "LR", and the step 90 of opening the set(s) of variable guide vanes 18, 19 is followed by the step 94 of closing the set(s) of variable guide vanes 18, 19. Yet further as shown in FIG. 9, in some embodiments in each given breathing cycle 86, the decreasing 96 the supply rate "SR" is started substantially immediately after an end of the increasing 92 the supply rate "SR", and closing 94 the set(s) of variable guide vanes 18, 19 is started substantially immediately after an end of the opening 90 the set(s) of variable guide vanes 18, 19.

Yet further as shown in FIG. 9, in some embodiments in each given breathing cycle 86, the opening 90 the set(s) of variable guide vanes 18, 19 is simultaneous with at least part of the increasing 92 the supply rate "SR", and the closing 94 the set(s) of variable guide vanes 18, 19 is simultaneous with at least part of the decreasing 96 the supply rate "SR". Yet further as shown in FIG. 9, in some embodiments in each given breathing cycle 86, the breathing-out phase 84 includes maintaining the set(s) of variable guide vanes 18, 19 closed, and maintaining the supply rate "SR" at the lower supply rate "LR".

As shown, in some embodiments, in the sequentially-next breathing out phase 84, the set(s) of variable guide vanes 18, 19 are further maintained closed for a pre-determined time period after the start of the sequentially-next breathing out phase 84. In some embodiments, this time delay is omitted, for example to suit a particular embodiment and/or application of the engine 10, 10', 10". In such embodiments, during the breathing-in phase 82 of a sequentially next breathing cycle 86, the opening 90 the set(s) of variable guide vanes 18, 19 starts at a substantially same time as a start of increasing 92 the supply rate "SR" of fuel to the combustor 13.

In some embodiments, the method 88 further includes monitoring, for example via the controller(s) 20', such as FADEC(s) 20', and corresponding sensor(s), a rotor speed "RS" (e.g. a relative rotational speed of the rotors 11, 12, 14, 15 in one non-limiting embodiment) of the engine 10, 10', 10", and in response to the rotor speed "RS" decreasing to a pre-determined sub-idle threshold "LT" during the breathing-out phase 84 of a given one of the breathing cycles 86, terminating the breathing-out phase 84 of the given cycle 86 and starting the breathing-in phase 82 of a sequentially next one of the breathing cycles 86. As shown, in some embodiments, during the breathing-in phase 82 of the sequentially next breathing cycle 86, the increasing 92 the supply rate "SR" of fuel to the upper supply rate "UR" starts substantially immediately after the rotor speed "RS" reaches the pre-determined sub-idle threshold "LR", and thereby ensures that the rotor speed "RS" does not materially drop below the pre-determined sub-idle threshold "LR" speed.

Figure 11:
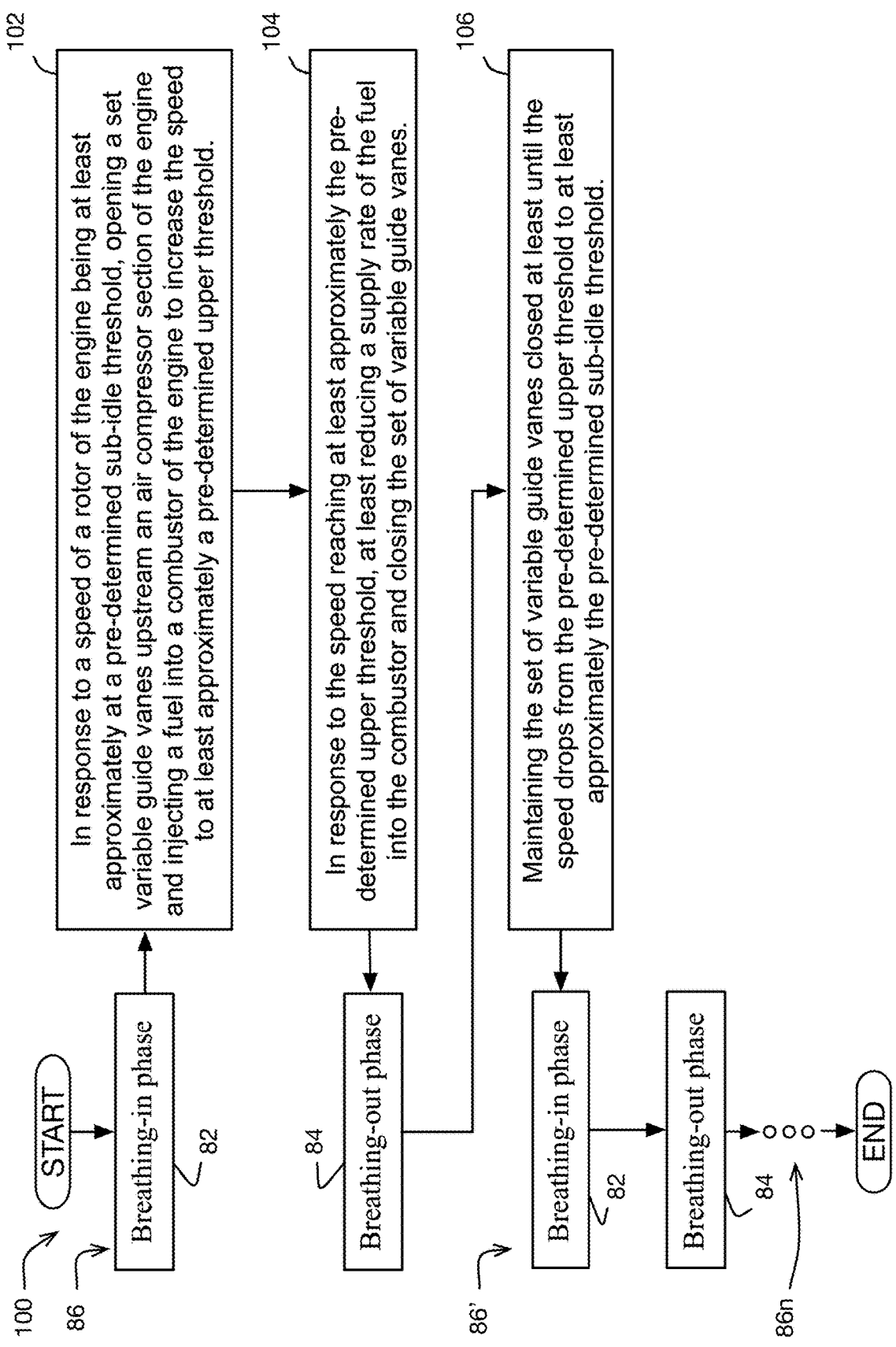
FIG. 11 is a schematic logic diagram showing a method implemented according to an embodiment of the present technology.

In another aspect and now referring to FIG. 11, the present technology further provides a method 100 of operating an engine 10, 10', 10" of a multi-engine aircraft 20, which includes operating the engine 10, 10', 10" in a sequential plurality of breathing cycles 86, 86' ... 86n, with each of the breathing cycles 86, 86' ... 86n including a breathing-in phase 82 followed by a breathing-out phase 84 as described above. For clarity, only the breathing-in phase 82 and the breathing-out phase 84 of one of the breathing cycles 86, 86' ... 86n is shown in FIG. 11 in detail.

In some embodiments of the method 100, a given breathing-in phase 82 may include a step 102 of: i) in response to a speed of a rotor 11, 12, 14, 15 of the engine 10, 10', 10" being at least approximately at a pre-determined sub-idle threshold "LT", opening a set variable guide vanes 18 and/or 19 disposed upstream of an air compressor section 11, 12 of the engine 10, 10', 10" and injecting 104 a fuel into a combustor 13 of the engine 10, 10', 10" to increase the speed to at least approximately a pre-determined upper threshold "UT", followed by a step 104 of ii) in response to the speed reaching at least approximately the pre-determined upper threshold "UT", at least reducing a supply rate "SR" of the fuel into the combustor 13 and closing the set of variable guide vanes 18 and/or 19.

In some such embodiments, a given breathing-out phase 84 may include a step 106 of maintaining the set of variable guide vanes 18 and/or 19 closed at least until the speed of the rotor 11, 12, 14, 15 drops from the pre-determined upper threshold "UT" to at least approximately the pre-determined sub-idle threshold "LT". In some such embodiments, in the breathing-in phase 84 of at least one repeating breathing cycle 86 of the breathing cycles 86, the at least reducing the supply rate "SR" starts before a start of the closing the set of variable guide vanes 18 and/or 19. In some such embodiments, in the breathing-in phase 82 of at least one repeating breathing cycle 86 of the breathing cycles 86, the opening 102 the set of variable guide vanes 18 and/or 19 starts at least approximately simultaneously with the injecting the fuel into the combustor 13, and the injecting the fuel includes rapidly increasing, and more particularly spiking, the supply rate of the fuel into the combustor 13. In some such embodiments, the at least reducing 106 the supply rate includes reducing the supply rate to a zero supply rate.

It is contemplated that particular timings, including starts and stops, of the steps, relative to each other, of the methods 88, 100 described above for each given engine 10, 10', 10" may be determined based on and/or dictated by each particular embodiment of that engine 10, 10', 10" and/or that engine's 10, 10', 10" application, using for example conventional engineering and design methods.

Thus, now referring back to any one of FIGS. 1 to 5, the present technology provides a multi-engine aircraft 20, such as a multi-engine helicopter 20, that includes a first engine 10' operable to provide motive power to the aircraft 20, a second engine 10" operable to provide motive power to the aircraft 20, and at least one controller 20' operatively connected to the first and second engines 10', 10".

In some such embodiments, the controller 20', which may be one or more suitable controllers of a control system of the aircraft 20 and/or the engine(s) 10', 10" for example, is configured to operate the first engine 10' in a sub-idle mode while operating the second engine 10" in an active mode (further, "first sub-idle configuration"). In some such embodiments, the controller 20' is configured to operate the second engine 10" in a sub-idle mode while operating the first engine 10' in an active mode (further, "second sub-idle configuration"), either in addition to or instead of being configured to operate in the first sub-idle configuration. Since the first and second sub-idle configurations may be similar, only the first sub-idle configuration is described in detail herein next.

Referring also to FIG. 9, operating the first engine 10' in the sub-idle mode according to the present technology may include sequentially executing, by the controller(s) 20', a plurality of breathing cycles 86, with each cycle 86 of the plurality of cycles 86 including a breathing-in phase 82 followed by a breathing-out phase 84. In some embodiments, the breathing-in phase 82 may include: i) modulating a set of variable guide vanes 18 and/or 19 in FIG. 1 upstream an air compressor section 11, 12 of the first engine 10' to an open position, and a fuel supply to a combustor 13 of the first engine 10' to an upper supply rate "UR", followed by ii) modulating the set of variable guide vanes 18 and/or 19 to at least a substantially closed position, and the fuel supply to a lower supply rate "LR" that is lower than the upper supply rate "UR". In some embodiments, the breathing-out phase 84 may include maintaining the set of variable guide vanes 18 and/or 19 at least substantially closed, at least until a sequentially next breathing-in phase 82 for example.

In some embodiments, the modulating the set of variable guide vanes 18 and/or 19 to the open position includes modulating the set of variable guide vanes 18 and/or 19 to at least a substantially open position. In some such embodiments, the modulating the set of variable guide vanes 18 and/or 19 includes modulating the set of variable guide vanes 18 and/or 19 to a completely open position. In some embodiments, the closing the modulating the set of variable guide vanes 18 and/or 19 includes completely closing modulating the set of variable guide vanes 18 and/or 19. In some such embodiments, the maintaining the set of variable guide vanes 18 and/or 19 at least substantially closed includes maintaining the set of variable guide vanes 18 and/or 19 completely closed.

As shown in FIG. 9, in some embodiments the at least one controller 20' is configured to start the modulating the fuel supply to the lower supply rate "LR" substantially immediately after terminating the modulating the fuel supply to the upper supply rate "UR", and to start the modulating the set of variable guide vanes 18 and/or 19 to the closed position substantially immediately after terminating the modulating the set of variable guide vanes 18 and/or 19 to the open position.

This control logic may be said to provide for a "spiking" of the opening and closing the set of variable guide vanes 18 and/or 19, and for at least a partially simultaneous "spiking" of the fuel supply rate. In some such embodiments, the at least one controller 20' is configured to start the spiking the fuel supply rate at least substantially simultaneously with starting the spiking of the set of variable guide vanes 18 and/or 19, and to terminate the spiking the fuel supply rate at least substantially simultaneously with terminating the spiking of the set of variable guide vanes 18 and/or 19. In some embodiments and applications, the spiking of the fuel supply rate according to the present technology may reduce a rate of and/or a likelihood of fuel coking in fuel manifold sections of the engine 10, 10', 10" being operated in a sub-idle mode of the present technology, in comparison with at least some prior art engine idling methods for example.

In some embodiments and such as where the aircraft 20 is a helicopter for example, the at least one controller 20' is configured to switch operation of the first engine 10' from the sub-idle mode into an active mode of the first engine 10' at any point in time during operation of the first engine 10' in the sub-idle mode. Similarly, in some embodiments, the at least one controller 20' is configured to switch operation of the second engine 10" from the sub-idle mode into an active mode of the second engine 10" at any point in time during operation of the second engine 10" in the sub-idle mode. The at least one controller 20' may be therefore selectively operable between the first and second sub-idle configurations described above.

Figure 12:
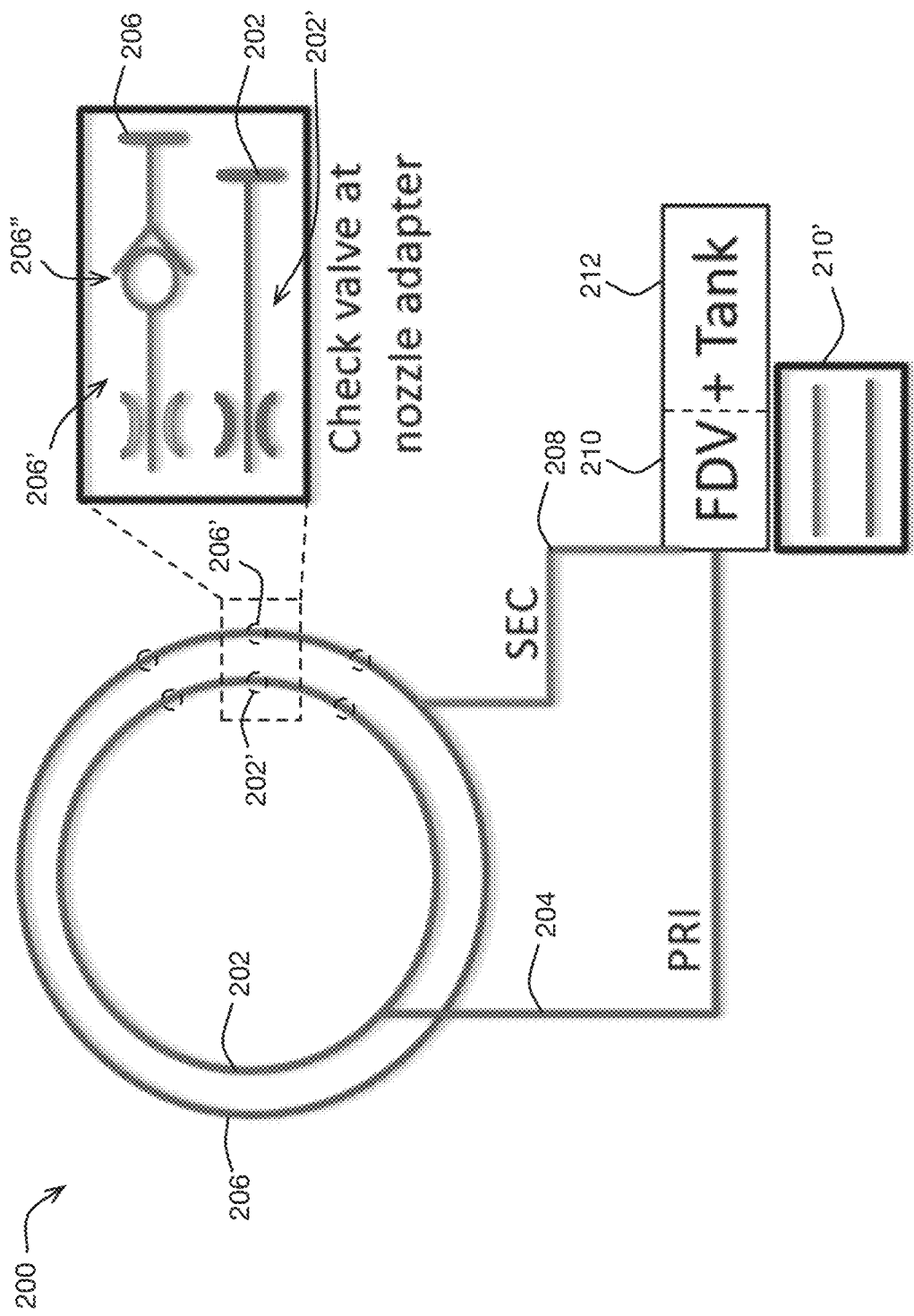
FIG. 12 is a schematic showing a fuel delivery system of the engine of FIG. 1.

The standby mode, including the various embodiments of the sub-idle mode, and active modes described above with respect to each of the first engine 10' and the second engine 10" may be implemented with, for example, a fuel delivery system 200, a non-limiting embodiment of which is shown in FIG. 12. While illustrated with respect to the abovementioned methods of operation, the fuel delivery system 200 may also be used to execute other types of engine operations, such as other types of standby modes for example. It should be noted that while the fuel delivery system 200 is described in detail with respect to the turboshaft gas turbine engines 10, 10', and 12", the fuel delivery system 200 may also be used with other types of aircraft engines. To maintain clarity of the description, the fuel delivery system 200 is described herein next with respect to the engine 10 of FIG. 1. Since in some embodiments as described above, each of the first engine 10' and the second engine 10" may be similar to the engine 10 with respect to which the fuel delivery system 200 is described, one or both of the first engine 10' and the second engine 10" may have and/or may be operated with a fuel delivery system 200.

Referring to FIGS. 1 and 12, the fuel delivery system 200 includes a first fuel manifold 202 positioned in the engine 10 and operable to deliver fuel to the combustor 16 of the engine 10. More particularly, as shown in FIG. 12, in the present embodiment the first fuel manifold 202 is annular and includes fuel nozzles 202' that are distributed circumferentially around the first fuel manifold 202. To maintain clarity, only some of the fuel nozzles 202' of the first fuel manifold 202 are shown in FIG. 12. The first fuel manifold 202 is fed with fuel from a fuel tank 212.

The fuel tank 212 may be a part of the aircraft with which the engine 10 may be used, may be a conventional fuel tank, and is therefore not described in detail herein. In some embodiments, the fuel tank 212 may include and/or be connected to an ecology tank. In this embodiment, the first fuel manifold 202 fluidly connects to the fuel tank 212 via a fuel conduit 204 and a fuel control valve 210 to receive fuel from the fuel tank 212. The fuel control valve 210 may be for example a conventional fuel control valve selected to provide for the functionality of the various embodiments of the fuel delivery system 200 described herein.

The fuel delivery system 200 further includes a second fuel manifold 206 positioned in the engine 10 and operable to deliver fuel to the combustor 16 of the engine 10. More particularly, as shown in FIG. 12, in the present embodiment the second fuel manifold 206 is annular and includes fuel nozzles 206' that are distributed circumferentially around the second fuel manifold 206. To maintain clarity, only some of the fuel nozzles 206' of the second fuel manifold 206 are shown in FIG. 12. As shown in FIG. 12, each of the fuel nozzles 206' includes a valve 206" therein.

In this embodiment, the valve 206" is a check valve oriented to allow fuel flow into the combustor 16 out of the fuel nozzle 206'. The check valve 206" prevents fuel flow through the fuel nozzle 206' in a direction from the fuel nozzle 206' toward the fuel tank 212, and more particularly in this embodiment from the combustor 16 into the fuel nozzle 206'. In some embodiments, the valve 206" is a control valve 206", such as a conventional control valve for example. In some such embodiments, the control valve 206" may be operatively connected to a suitable actuator, such as a conventional actuator, and may be controlled via a suitable controller, such as a conventional controller.

In some such embodiments, the control valve 206" may be selectively operated to block fuel flow to, and out of/from, the fuel nozzle 206' into the combustor 16, to allow fuel flow out of the fuel nozzle 206' into the combustor 16, and in some embodiments to modulate this flow. As used herein, the terms "block" and "blocking" with respect to fuel flow, except for where explicitly stated otherwise, mean that the flow is either completely blocked, or that the flow is restricted so as to provide a trickle flow, as the term "trickle flow" is defined in this document.

In some embodiments, such as the present embodiment for example, the control valve 206" includes the check valve functionality described above, for example by including a check valve therein. In such embodiments, the control valve 206" may be said to be a check valve. In some embodiments, the valve 206" may be multiple valves, such as a combination of a check valve and a control valve for example, which may be selected to provide the functionality described herein.

In some embodiments, the fuel nozzle 206' may be configured to provide a trickle flow of fuel to the combustor 16 at least when the engine 10 is operated in the standby mode. More particularly, in this embodiment, the control valve 206" is operable to provide a trickle flow of fuel out of the fuel nozzle 206' to the combustor 16 at least when the engine 10 is operated in a standby mode, such as one of the standby modes described herein above for example. As used herein, the term "trickle flow" through a given element, such as a fuel nozzle or a fuel conduit, refers to a flow that is a fraction of a design flow rate through the given element, the range being selected so as to provide substantially no motive power to the engine 10 when the trickle flow is combusted in the combustor 16. Stated otherwise, the trickle flow may be defined as a fuel flow rate selected to prevent flame-out (i.e. unintended loss) of combustion in the combustor 16 while providing one of: substantially no motive power to the engine 10, and no motive power to the engine 10, via the combustion of the trickle flow of fuel.

As an example, in some embodiments where the engine 10 is one of multiple similar engines powering for example a helicopter via a common conventional gearbox of the helicopter, the trickle flow of fuel to the one of the engines 10 may be selected to lower an output of the one engine 10 sufficiently low so as to decouple the one engine 10 from the common gearbox while maintaining combustion in the one engine 10. In such cases, the engine 10 may be said to provide no motive power, since whatever output the engine 10 may maintain does not get transferred into the common gearbox and hence does not get transferred into powering the aircraft/helicopter. According to other possible control sequences in a similar helicopter example, the trickle flow of fuel to the one of the engines 10 may be selected to lower an output of the one engine 10 sufficiently low so as to maintain the one engine 10 coupled to the common gearbox just above the point (e.g. rotations per minute and/or power) below which the one engine 10 will decouple from the common gearbox. In such scenarios, the trickle fuel flow may be said to be controlled so as to provide substantially no motive power to the aircraft/helicopter.

For example, the range may equal to between 0% and 5% of a full throttle flowrate that the given fuel nozzle 206' may be configured to provide. In some embodiments, the range may equal to between 0% and 4% of a full throttle flowrate that the given fuel nozzle 206' may be configured to provide. In some embodiments, the range may equal to between 0% and 3% of a full throttle flowrate that the given fuel nozzle 206' may be configured to provide. In some embodiments, the range may equal to between 0% and 2% of a full throttle flowrate that the given fuel nozzle 206' may be configured to provide. In some embodiments, the range may equal to between 0% and 1% of a full throttle flowrate that the given fuel nozzle 206' may be configured to provide. In some such embodiments, the ranges exclude the 0% so as to provide for at least a marginal flow. In some embodiments, the range may equal to between 0.1% and 1% of a full throttle flowrate that the given fuel nozzle 206' may be configured to provide. The range may be different in other embodiments, and more particularly may be defined to suit each particular embodiment of the engine 10. In some embodiments, a lower limit of a range of trickle fuel flow may be defined as a minimum fuel flow rate required for stable engine operation within a range of flight conditions for which the given aircraft may be designed. In some such embodiments, the range of fuel flow may be subject to hot end durability requirements. In some such embodiments, an upper limit of the range of trickle fuel flow may be defined as a maximum flow rate may be determined by normal engine idle fuel flow rate at those flight conditions.

In the present embodiment, the second fuel manifold 206 is fed with fuel from the fuel tank 212. As shown, the fuel tank 212 may be the same fuel tank 212 that feeds the first fuel manifold 202. In other embodiments, this may not be the case. In some embodiments, the fuel tank 212 may be multiple fuel tanks. In this embodiment, the second fuel manifold 206 fluidly connects to the fuel tank 212 via a fuel conduit 208 and the same fuel control valve 210 as feeds the first fuel manifold 202, to receive fuel from the fuel tank 212. In other embodiments, the fuel control valve 210 may be for example multiple conventional fuel control valves selected to provide for the functionality of the various embodiments of the fuel delivery system 200 described herein. For example, in some embodiments each of the fuel conduits 204, 208 may be defined in part by one or more dedicated fuel control valves 210 selected to provide for the functionality of the various embodiments of the fuel delivery system 200 described herein.

As shown schematically in FIG. 12 with reference numeral 210', in this embodiment of the fuel delivery system 200, there is no cross-flow between the fuel conduits 204, 208 at the fuel control valve 210 or the fuel tank 212. In this embodiment, the fuel control valve 210 is operable to do any one of: i) supply fuel from the fuel tank 212 to both the first and second fuel manifolds 202, 206, ii) supply fuel from the fuel tank 212 to the first fuel manifold 202 while blocking fuel supply to the second fuel manifold 206, and iii) supply fuel from the fuel tank 212 to the second fuel manifold 206 while blocking fuel supply to the first fuel manifold 202. While in the present embodiment the fuel delivery system 200 includes two fuel manifolds 202, 206 that are selectively fed with fuel from the fuel tank 212, in other embodiments, the fuel delivery system 200 may include additional one or more fuel manifolds that may be fed from the one or more fuel tanks 212 via additional corresponding fuel conduit(s). In some such embodiments, at least some of the additional fuel manifolds may be similar to the second fuel manifold 206.

Figure 13:
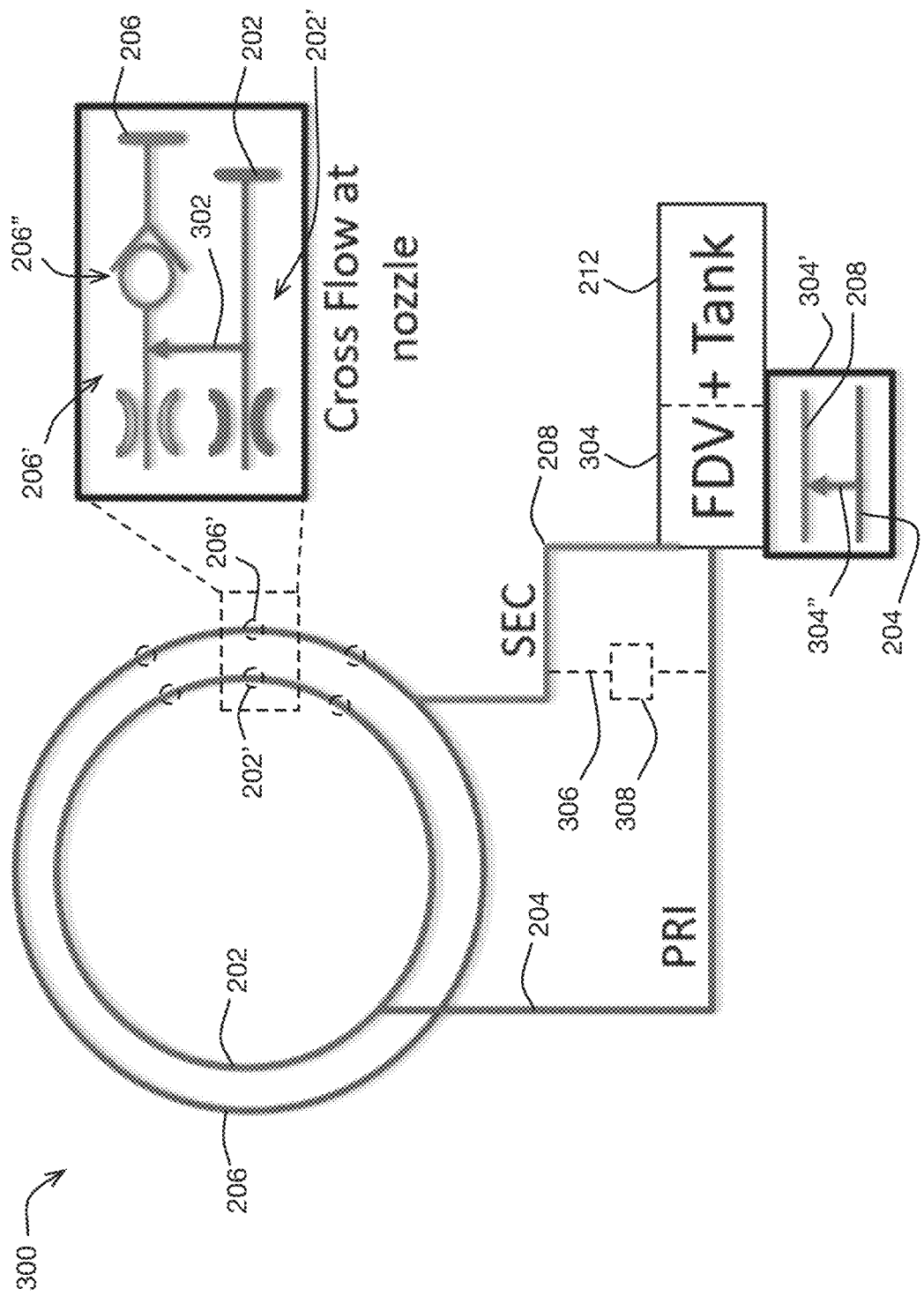
FIG. 13 is a schematic showing the fuel delivery system of FIG. 12, according to another embodiment.

Now referring to FIG. 13, a fuel delivery system 300 is shown. The fuel delivery system 300 is similar to the fuel delivery system 200. Therefore, elements of the fuel delivery system 300 that correspond to elements of the fuel delivery system 200 have been labeled with the same reference numerals.

A difference between the fuel delivery system 300 and the fuel delivery system 200 is that the fuel delivery system 300 includes cross-flow conduits 302 that fluidly connect fuel nozzles 202' of the first fuel manifold 202 to the fuel nozzles 206' of the second fuel manifold 206. More particularly, in this embodiment and as shown in FIG. 13 with respect to one corresponding pair of fuel nozzles 202', 206' to maintain clarity of the figure, each fuel nozzle 202' of the first fuel manifold 202 fluidly connects to one respective fuel nozzle 206' of the second fuel manifold 206 via a cross-flow conduit 302 at a location that is downstream of the valve 206" of the respective fuel nozzle 206'. Since in this embodiment the cross-flow connection is similar for all corresponding pair of fuel nozzles 202', 206', to maintain clarity of the figure, the cross-flow connection is shown in FIG. 13 and described next with respect to only one of the corresponding pairs of fuel nozzles 202', 206'.

Also in this embodiment, and as shown in FIG. 13, the first fuel manifold 202 is fluidly connected to a fuel tank 212 via a fuel conduit 204 that connects into the first fuel manifold 202 at a point that is upstream of all of the fuel nozzles 202' of the first fuel manifold 202. Similarly in this embodiment, and as shown in FIG. 13, the second fuel manifold 206 is fluidly connected to a fuel tank 212, such as but not necessarily the same fuel tank 212, via a fuel conduit 208 that connects into the second fuel manifold 206 at a point that is upstream of all of the fuel nozzles 206' of the second fuel manifold 206. Accordingly, each of the cross-flow conduits 302 may be said to be fluidly connected to the first fuel manifold 202 at a point that is downstream of the point of connection of the fuel conduit 204 into the first fuel manifold 202, and to the second fuel manifold 206 at a point that is downstream of the point of connection of the fuel conduit 208 into the second fuel manifold 206.

In the present embodiment, the cross-flow conduit 302 is configured, such as via one or more suitable flow control devices for example, to provide a trickle flow from the fuel nozzle 202' of the first fuel manifold 202 to the fuel nozzle 206' of the second fuel manifold 206 at least when the engine 10 is operated in a standby mode, such as one of the standby modes described herein above. In some embodiments, the flow limiter may be a conventional control valve for example. As another example, in some embodiments, the flow control device may be a flow control aperture and/or a flow control valve and/or a flow restrictor, selected to provide the trickle flow through the cross-flow conduit 302. It is contemplated that any suitable conventional one or more flow control devices may be used to provide the trickle flow.

In some embodiments, the trickle flow may be in a range of 0% and 5% of a full throttle flowrate that the fuel nozzle 206' may be configured to provide. In some embodiments, the range may equal to between 0% and 4% of a full throttle flowrate that the fuel nozzle 206' may be configured to provide. In some embodiments, the range may equal to between 0% and 3% of a full throttle flowrate that the fuel nozzle 206' may be configured to provide. In some embodiments, the range may equal to between 0% and 2% of a full throttle flowrate that the fuel nozzle 206' may be configured to provide. In some embodiments, the range may equal to between 0% and 1% of a full throttle flowrate that the fuel nozzle 206' may be configured to provide. In some such embodiments, a given range may exclude the 0% so as to provide for at least a marginal flow. In some embodiments, the range may equal to between 0.1% and 1% of a full throttle flowrate that the fuel nozzle 206' may be configured to provide. This range may be different in other embodiments, and more particularly may be defined to suit each particular embodiment of the engine 10. In some embodiments, a range of trickle fuel flow may be defined as described above.

In other embodiments, a different number and/or configuration of the cross-flow conduits 302 may be used to provide for the functionality described herein. For example, in some embodiments, a cross-flow conduit 302 may fluidly connect to multiple fuel nozzles 206' of the second fuel manifold 206 downstream of the valves 206" of those fuel nozzles 206'.

Still referring to FIG. 13, another difference between the fuel delivery system 300 and the fuel delivery system 200 is that in the fuel delivery system 300, as shown with reference numeral 304', the fuel control valve 304 is operable to provide a trickle flow of fuel from the first fuel conduit 204 to the second fuel conduit 208. More particularly, the fuel control valve 304 may be selected to be operable to do any one of: i) supply fuel from the fuel tank 212 to both the first and second fuel manifolds 202, 206, ii) supply fuel from the fuel tank 212 to the first fuel manifold 202 while blocking fuel supply to the second fuel manifold 206, iii) supply fuel from the fuel tank 212 to the second fuel manifold 206 while blocking fuel supply to the first fuel manifold 202, and iv) supply a trickle flow of fuel from the first fuel conduit 204 to the second fuel conduit 208 while blocking fuel supply to the second fuel manifold 206.

In some embodiments, the trickle flow may be in a range between 0% and 5% of a full throttle flowrate that the second fuel manifold 206 may be configured to provide. In some embodiments, the range may equal to between 0% and 4% of a full throttle flowrate that the second fuel manifold 206 may be configured to provide. In some embodiments, the range may equal to between 0% and 3% of a full throttle flowrate that second fuel manifold 206 may be configured to provide. In some embodiments, the range may equal to between 0% and 2% of a full throttle flowrate that the second fuel manifold 206 may be configured to provide. In some embodiments, the range may equal to between 0% and 1% of a full throttle flowrate that the second fuel manifold 206 may be configured to provide. In some such embodiments, the ranges exclude the 0% so as to provide for at least a marginal flow. In some embodiments, the range may equal to between 0.1% and 1% of a full throttle flowrate that the second fuel manifold 206 may be configured to provide. This range may be different in other embodiments, and more particularly may be defined to suit each particular embodiment of the engine 10. For example, in some embodiments, a range of trickle fuel flow may be defined as described above.

As shown, in some embodiments, the fuel control valve 304 may include a cross-flow conduit 304" therein for providing the trickle flow. In other embodiments, a cross-flow conduit 306 may be provided separate from the valve 304. For example, the trickle flow of fuel may be provided via a cross-flow conduit 306 that may extend for example from the first fuel conduit 204 to the second fuel conduit 208 at points upstream of the first and second fuel manifolds 202, 206 but downstream of the valve 304. In some such embodiments, this trickle flow may be provided while blocking fuel supply to the second fuel manifold 206 using the valve 304, and/or while blocking fuel supply out of the second fuel manifold 206 into the combustor 16 using each of the valves 206" in the second fuel manifold 206. In some embodiments, the cross-flow conduit 306 may include flow control devices 308 therein, such as one or more conventional flow modulating valves and/or flow restrictors and/or flow control apertures for example, to provide for and/or modulate the trickle flow to be within a given range of trickle flows, as described above.

Figure 14:
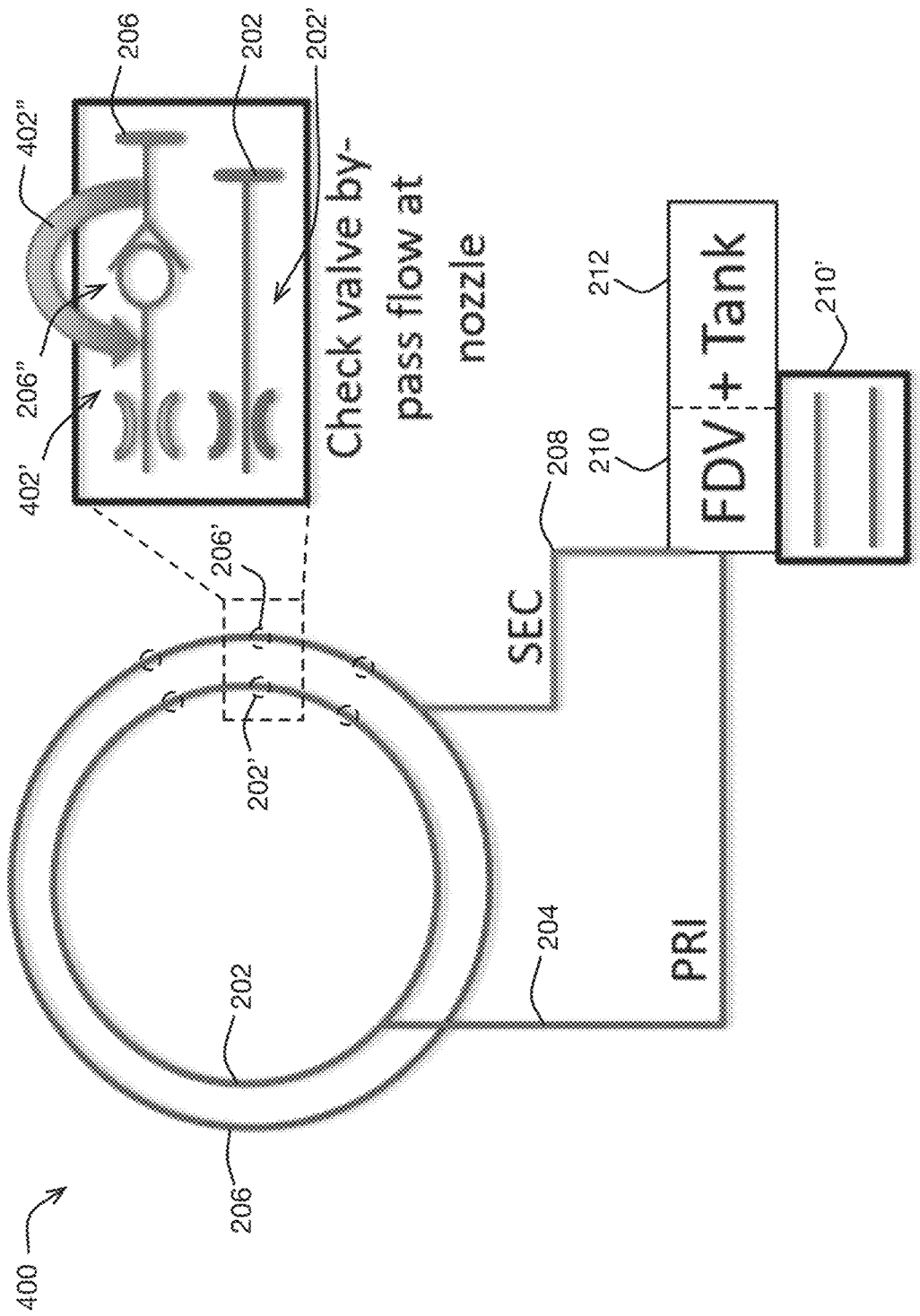
FIG. 14 is a schematic showing the fuel delivery system of FIG. 12, according to yet another embodiment.

Now referring to FIG. 14, a fuel delivery system 400 is shown. The fuel delivery system 400 is similar to the fuel delivery system 200. Therefore, elements of the fuel delivery system 400 that correspond to elements of the fuel delivery system 200 have been labeled with the same reference numerals. Similar to the description of the fuel delivery systems 200 and 300 above, the fuel delivery system 400 is described with respect to one corresponding pair of fuel nozzles 202' and 402'. In this embodiment, the other corresponding pairs of fuel nozzles 202' and 402' are similar to the corresponding pair of fuel nozzles 202' and 402' that is shown in detail in FIG. 14 and described in detail herein below. In some embodiments, the fuel delivery system 400 may have other types of fuel nozzles as well.

As shown in FIG. 14, a difference between the fuel delivery system 400 and the fuel delivery system 200 is that each of the fuel nozzles 402' of the second fuel manifold 206 of the fuel delivery system 400 includes a by-pass 402" around the valve 206" of that fuel nozzle 402'. The by-pass 402" in this embodiment is provided via a suitable fuel conduit connecting a point upstream of the valve 206" to a point downstream of the valve 206". However, any other suitable by-pass may be used to provide for the functionality described herein.

For example, in some embodiments, the valve 206" may include the by-pass 402" therein. In some embodiments, the by-pass 402" may include one or more flow control devices therein, such as conventional flow modulating valves and/or flow restrictors for example, to provide for and/or modulate the trickle by-pass flow to be within a given range of trickle by-pass flows, as described above. In some embodiments, the range may equal to between 0% and 5% of a full throttle flowrate that the fuel nozzle 402' may be configured to provide. In some embodiments, the range may equal to between 0% and 4% of a full throttle flowrate that the fuel nozzle 402' may be configured to provide. In some embodiments, the range may equal to between 0% and 3% of a full throttle flowrate that the fuel nozzle 402' may be configured to provide. In some embodiments, the range may equal to between 0% and 2% of a full throttle flowrate that the fuel nozzle 402' may be configured to provide. In some embodiments, the range may equal to between 0% and 1% of a full throttle flowrate that the fuel nozzle 402' may be configured to provide. In some such embodiments, a given range may exclude the 0% so as to provide for at least a marginal flow. In some embodiments, the range may equal to between 0.1% and 1% of a full throttle flowrate that the fuel nozzle 402' may be configured to provide. This range may be different in other embodiments, and more particularly may be defined to suit each particular embodiment of the engine 10. For example, in some embodiments, a range of trickle fuel flow may be defined as described above.

The various embodiments of fuel delivery system structures described above permit the second fuel manifold(s) 206 to be maintained at least substantially wet (i.e. filled with fuel) while the second fuel manifold(s) 206 is/are blocked to keep the engine 10 in a standby mode. In an aspect, the placement of the valves 206" in the fuel nozzles 206' of the second fuel manifold(s) 206 allows to increase a percentage of the second fuel manifold(s) 206 that is maintained wet in such operating conditions.

Accordingly, in an aspect, the fuel delivery systems 200, 300, 400 described herein help reduce a response time associated with a switch of the engine 10 from a standby mode to an active mode. In a further aspect, the provision of the one or more trickle flows by the fuel delivery systems 200, 300, 400 as described herein above helps reduce fuel stagnation and/or coking in the fuel nozzles 206' that are kept "idle" to keep the engine 10 in a standby mode. In a further aspect, the provision of the one or more trickle flows by the fuel delivery systems 200, 300, 400 helps improve thermal distribution within the fuel nozzles 206'.

With the various embodiments of the fuel delivery systems 200, 300, 400 described above in mind, the present technology provides methods of operating engines and fuel delivery systems. These methods are described in detail next.

Figure 15:
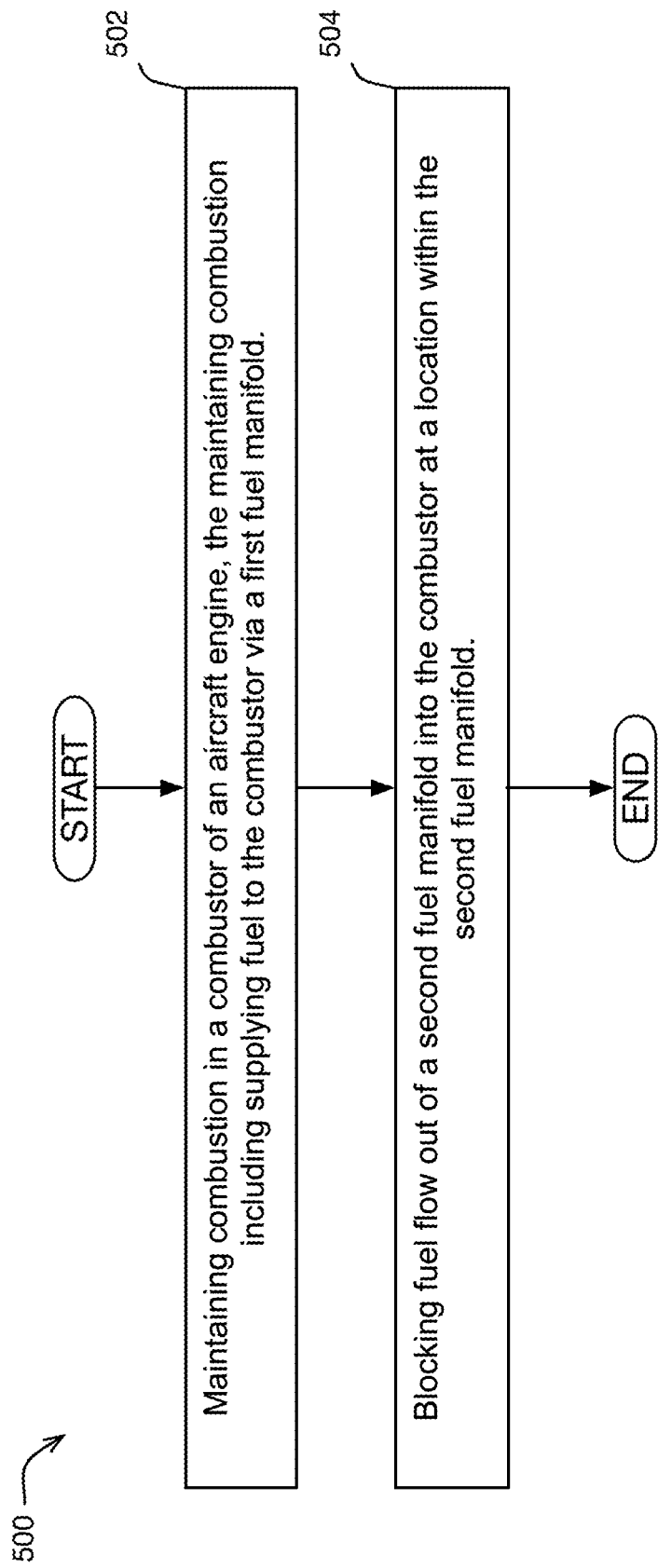
FIG. 15 is a schematic logic diagram showing a method implemented according to an embodiment of the present technology.

Referring to FIG. 15, the present technology provides a method 500 of operating an aircraft engine 10. In some embodiments, the method 500 includes a step 502 of maintaining combustion in a combustor 16 of the aircraft engine 10. The maintaining combustion includes supplying fuel to the combustor 16 via a first fuel manifold 202 while executing a step 504 of blocking fuel flow out of a second fuel manifold 206 into the combustor 16 at a location within the second fuel manifold 206. As seen above, in some embodiments, the step 504 of substantially blocking fuel flow may include at least substantially closing at least one valve, such as the valve 206' for example, in the second fuel manifold 206. Also as seen above, in some embodiments, the step 504 of substantially blocking fuel flow may include at least substantially closing, or at least moving into a corresponding position, at least one valve, such as the fuel control valve 210 for example, upstream of the second fuel manifold 206.

In some embodiments, the step 504 of blocking fuel flow may include providing a trickle flow of fuel into the combustor 16 out of the second fuel manifold 206. In some embodiments, the providing the trickle flow may include incompletely closing the at least one valve 206" in the second fuel manifold 206. In some such embodiments, the providing the trickle flow may include incompletely closing each of the valves 206" in the second fuel manifold 206, and more particularly in each of the fuel nozzles 206', 402' thereof. In some such embodiments, the providing the trickle flow may include modulating the trickle flow provided by each of the valves 206", by modulating each of the valves 206". In some embodiments, the modulating may be executed using a suitable control sequence, such as a conventional control sequence, to maintain the trickle flow provided by each of the valves 206" within a given range of flows, such as described herein above for example.

In some embodiments, the providing the trickle flow may include providing a by-pass 402" across at least one valve 206" in the second fuel manifold 206. In some such embodiments, the providing the trickle flow may include providing a by-pass 402" across each of the valves 206" in the second fuel manifold 206, and more particularly in each of the fuel nozzles 206', 402' thereof. Stated otherwise, the providing the trickle flow may include bypassing at least one closed valve 206" in at least one fuel nozzle 206' of the second fuel manifold 206, and in some embodiments, bypassing the closed valve 206" in each fuel nozzle 206' of the second fuel manifold 206.

In some embodiments, the providing the trickle flow may include providing a trickle flow of fuel from a fuel conduit 204 upstream of the first fuel manifold 202 to a fuel conduit 208 upstream of the second fuel manifold 206. In some embodiments, this trickle flow is provided via a cross-flow conduit 306 disposed upstream of the first and second fuel manifolds 202, 206 and interconnecting the fuel conduits 204, 208 that supply fuel to the first and second fuel manifolds 202, 206. In some embodiments, the providing the trickle flow includes controlling a flow control valve 304 fluidly connected to both the fuel conduit 204 upstream of the first fuel manifold 202 and the fuel conduit 208 upstream of the second fuel manifold 206. In some such embodiments, the cross-flow conduit 306 is disposed downstream of the flow control valve 304.

In some embodiments, the step 504 of blocking fuel flow may include providing a trickle flow of fuel from the first fuel manifold 202 to the second fuel manifold 206. In some embodiments, the providing the trickle flow of fuel from the first fuel manifold 202 to the second fuel manifold 206 includes providing the trickle flow to a location downstream of at least one valve 206" in the second fuel manifold 206, and more particularly in at least one fuel nozzle 206' thereof. In some such embodiments, the providing the trickle flow of fuel from the first fuel manifold 202 to the second fuel manifold 206 includes providing the trickle flow from fuel nozzles 202' of the first fuel manifold 202 to the fuel nozzles 206' of the second fuel manifold 206.

More particularly, in some embodiments, the trickle flow may be provided from each fuel nozzle 202' of the first fuel manifold 202 to one fuel nozzle 206' of the second fuel manifold 206, at a location downstream of the valve 206" of that fuel nozzle 206' of the second fuel manifold 206. In some embodiments, the providing the trickle flow may include modulating the trickle flow, for example to maintain the trickle flow within a given range of flows, such as described herein above for example. In some embodiments, the providing the trickle flow is into the combustor 16 out of the second fuel manifold 206, and more particularly out of each fuel nozzle 206' of the second fuel manifold 206.

In some embodiments, the step 502 of maintaining combustion is part of operating the aircraft engine 10 in a standby mode, such as one of the standby modes described above for example, and the method 500 further includes switching the aircraft engine 10 from the standby mode to an active mode, as the active mode is described above, the switching including unblocking fuel flow out of the second fuel manifold 206 into the combustor 16. In some embodiments, the unblocking fuel flow includes opening the at least one valve 206" in the second fuel manifold 206, and in some cases opening all of the valves 206" in the second fuel manifold 206.

In at least some embodiments and applications, the various embodiments of the method 500 described herein may help reduce a response time associated with a switch of the engine 10 from a standby mode to an active mode. In at least some of the embodiments of the method 500 described above, the method 500 includes maintaining the second fuel manifold 206 and its associated fuel supply conduit 208 wet (i.e. at least substantially filled with fuel) while fuel supply out of the second fuel manifold 206 into the combustor 16 is blocked.

While the second fuel manifold 206 is blocked, providing at least one of the various trickle flows associated with the second fuel manifold 206 as described herein above, in at least some applications, helps reduce fuel stagnation and/or coking in the fuel nozzles 206' of the second fuel manifold 206. In another aspect, provision of at least one of the various trickle flows associated with the second fuel manifold 206 as described herein above, in at least some applications, helps improve thermal management of the fuel nozzles 206' of the second fuel manifold 206.

Figure 16:
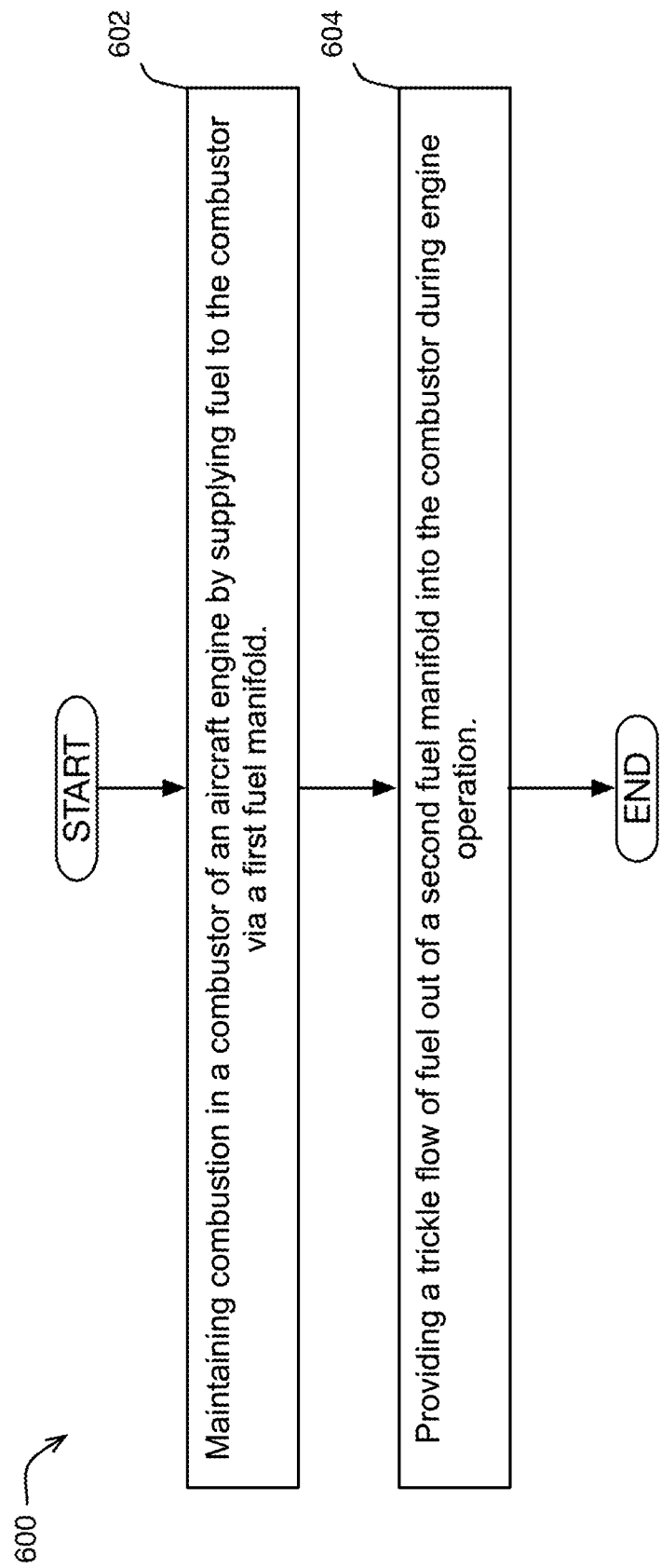
FIG. 16 is a schematic logic diagram showing a method implemented according to another embodiment of the present technology.

Now referring to FIG. 16, the present technology also provides a method 600 of operating an engine fuel delivery system 200, 300, 400 of an aircraft engine 10. The method 600 includes a step 602 of maintaining combustion in a combustor 16 of the aircraft engine 10 by supplying fuel to the combustor 16 via a first fuel manifold 202. In some embodiments, the method 600 may include a step 604, which may be executed while step 602 is being executed. Step 604 may include providing a trickle flow of fuel out of a second fuel manifold 206 into the combustor 16. In some embodiments and applications, the method 600 may be implemented with respect to fuel delivery systems 200, 300, 400 having more than two fuel manifolds 202, 206. In some such embodiments, the step 604 may include providing a trickle flow of fuel out of the second fuel manifold 206 and the one or more additional fuel manifolds. The one or more additional fuel manifolds may be similar to the second fuel manifold 206, and are therefore not described in detail herein.

In some embodiments, the providing the trickle flow includes providing a trickle flow of fuel out of the second fuel manifold via a by-pass 402" across a valve 206" in the second fuel manifold 206, and in some embodiments across each valve 206" in the second fuel manifold 206. In some embodiments, the providing the trickle flow includes providing a trickle flow of fuel to a location downstream of a valve 206" in each fuel nozzle 206' of the second fuel manifold 206 from at least one fuel nozzle 202' of the first fuel manifold 202. In some embodiments, the providing the trickle flow includes incompletely closing a valve 206" in each fuel nozzle 206' of the second fuel manifold 206. Stated otherwise, the providing the trickle flow of fuel out of the second fuel manifold 206 may include positioning a valve 206" in each fuel nozzle 206' in the second fuel manifold 206 to a substantially closed position.

In some embodiments, the method 600 further includes providing a trickle flow of fuel from a fuel conduit 204 upstream of the first fuel manifold 202 to a fuel conduit 208 upstream of the second fuel manifold 206 while providing the trickle flow of fuel out of the second fuel manifold 206 via at least one of the ways as described above. In some embodiments, the method 600 further includes modulating at least one of the trickle flow out of the second fuel manifold 206 and the trickle flow provided into the fuel conduit 208 upstream of the second fuel manifold 206.

In some embodiments, the step 602 of maintaining combustion is part of operating the aircraft engine 10 in a standby mode, such as one of the standby modes described above for example, and the method 600 further includes switching the aircraft engine 10 from the standby mode to an active mode, as the active mode is described above, the switching including unblocking fuel flow out of the second fuel manifold 206 into the combustor 16. In some embodiments, the unblocking fuel flow includes opening at least one valve 206" in the second fuel manifold 206, and in some cases opening a valve 206" in each fuel nozzle 206' of the second fuel manifold 206.

In at least some embodiments and applications, the various embodiments of the method 600 described herein may help reduce a response time associated with a switch of the engine 10 from a standby mode to an active mode. In at least some of the embodiments of the method 600 described above, the method 600 includes maintaining the second fuel manifold 206 and its associated fuel supply conduit 208 wet (i.e. at least substantially filled with fuel) while fuel supply out of the second fuel manifold 206 into the combustor 16 is blocked.

While the second fuel manifold 206 is blocked, providing at least one of the various trickle flows associated with the second fuel manifold 206 as described herein above, in at least some applications, helps reduce fuel stagnation and/or coking in the fuel nozzles 206' of the second fuel manifold 206. In another aspect, provision of at least one of the various trickle flows associated with the second fuel manifold 206 as described herein above, in at least some applications, helps improve thermal management of the fuel nozzles 206' of the second fuel manifold 206.

The particulars of how some of the functions described above are not described in detail to maintain clarity of this description, because those particulars may depend on each given embodiment of the aircraft 20 and the controller(s) 20' with which the present technology is implemented, and because those particulars may be implemented using suitable corresponding conventional components of the aircraft 20 and using suitable conventional control methods.

The above description is meant to be exemplary only, and one skilled in the art will recognize that changes may be made to the embodiments described without departing from the scope of the disclosed technology. For example, in some embodiments, the sub-idling methods and technology described herein may be implemented by using dedicated actuated panel(s) 16' (FIG. 1) disposed at or in the air inlet(s) 16 of an engine 10 upstream of the compressor section(s) 11, 12, instead of or in addition to using the set(s) of variable guide vanes 18, 19. In some such embodiments, the panel(s) 16' may be configured to substantially completely shut off airflow to the respective air inlet(s) 16 when actuated to a closed position, and to substantially fully open the air inlet(s) 16 when actuated to an open position.

Similar to the variable guide vanes 18, 19, actuation and control of the panel(s) 16' may be executed using any suitable actuator(s), and using any suitable controller(s) of the engine 10 and/or the aircraft 20. As yet another example, as shown in FIGS. 2-5 for example, in some embodiments, one or more of the air systems 30, 40, 50 may include one or more pressure wave dampers 31, as described in the co-owned U.S. Provisional Patent Application No. 62/855,131, entitled "AIR SYSTEM OF MULTI-ENGINE AIRCRAFT", filed on May 31, 2019, and hereby expressly incorporated herein by reference.

Still other modifications which fall within the scope of the present disclosure will be apparent to those skilled in the art, in light of a review of this disclosure.

The invention claimed is:

1. A method of operating a fuel delivery system of an aircraft engine of an aircraft, comprising:
when the aircraft is in flight at a sustained altitude, operating the aircraft engine in a standby mode in which the aircraft engine is operating and providing substantially no motive power to the aircraft by:
maintaining combustion in a combustor of the aircraft engine by supplying fuel to the combustor via a first set of fuel nozzles circumferentially distributed about a first fuel manifold while providing a trickle flow of fuel via a second set of fuel nozzles circumferentially distributed about a second fuel manifold into the combustor during engine operation, the trickle flow being defined as a fuel flow rate selected to prevent flame-out of the combustion while providing substantially no motive power to the aircraft via the combustion of the trickle flow of fuel.

2. The method of claim 1, wherein the providing the trickle flow includes providing the trickle flow of fuel out of the second fuel manifold via a by-pass across a valve in the second fuel manifold.

3. The method of claim 2, wherein the providing the trickle flow includes providing the trickle flow of fuel out of the second fuel manifold via a by-pass across a valve in each of a plurality of fuel nozzles of the second fuel manifold.

4. The method of claim 2, wherein the providing the trickle flow includes providing the trickle flow of fuel to a location downstream of a valve in each fuel nozzle of the second fuel manifold from at least one fuel nozzle of the first fuel manifold.

5. The method of claim 2, wherein the providing the trickle flow includes incompletely closing a valve in each fuel nozzle of the second fuel manifold.

6. The method of claim 2, further comprising providing the trickle flow of fuel from a fuel conduit upstream of the second fuel manifold.

7. The method of claim 6, further comprising modulating the trickle flow provided from the fuel conduit upstream of the second fuel manifold.

8. The method of claim 1, wherein the providing the trickle flow of fuel out of the second fuel manifold includes positioning a valve in each fuel nozzle in the second fuel manifold to a substantially closed position.

9. The method of claim 1, wherein the maintaining combustion is part of operating the aircraft engine in the standby mode, and the method further includes switching the aircraft engine from the standby mode to an active mode, the switching including unblocking fuel flow out of the second fuel manifold.

10. The method of claim 9, wherein the unblocking fuel flow includes opening a valve in each fuel nozzle in the second fuel manifold.

11. The method of claim 1, wherein supplying fuel to the combustor via the first set of fuel nozzles circumferentially distributed about the first fuel manifold includes circulating the fuel circumferentially through the first fuel manifold and through circumferentially distributed fuel nozzles of the first set of fuel nozzles.

12. The method of claim 1, wherein providing the trickle flow of fuel via the second set of fuel nozzles circumferentially distributed about the second fuel manifold includes circulating the trickle flow of fuel circumferentially through the second fuel manifold and through at least two fuel nozzles of the second set of fuel nozzles.

* * * * *